(12) United States Patent
Bailey

(10) Patent No.: US 8,364,309 B1
(45) Date of Patent: Jan. 29, 2013

(54) USER-ASSISTED ROBOT NAVIGATION SYSTEM

(76) Inventor: Bendrix L. Bailey, Rochester, MA (US)

( * ) Notice: Subject to any disclaimer, the term of this patent is extended or adjusted under 35 U.S.C. 154(b) by 765 days.

(21) Appl. No.: 12/502,699

(22) Filed: Jul. 14, 2009

(51) Int. Cl.
*G06F 19/00* (2011.01)

(52) U.S. Cl. ...................................... 700/245

(58) Field of Classification Search ............... 901/1–50; 700/184, 183, 186–195, 245–264; 701/1, 701/23–27, 400–512, 516, 518, 521, 525, 701/527, 532, 538
See application file for complete search history.

(56) References Cited

U.S. PATENT DOCUMENTS

| | | | | |
|---|---|---|---|---|
| 4,658,928 A | * | 4/1987 | Seo | 180/168 |
| 4,800,978 A | * | 1/1989 | Wasa et al. | 180/168 |
| 4,809,178 A | * | 2/1989 | Ninomiya et al. | 701/23 |
| 4,847,774 A | * | 7/1989 | Tomikawa et al. | 701/23 |
| 4,994,970 A | * | 2/1991 | Noji et al. | 701/25 |
| 5,189,612 A | * | 2/1993 | Lemercier et al. | 701/23 |
| 5,204,814 A | * | 4/1993 | Noonan et al. | 701/25 |
| 5,216,605 A | * | 6/1993 | Yardley et al. | 701/23 |
| 5,321,614 A | * | 6/1994 | Ashworth | 701/26 |
| 5,525,882 A | * | 6/1996 | Asaka et al. | 318/568.16 |
| 5,596,255 A | * | 1/1997 | Miyazawa | 318/568.12 |
| 5,677,836 A | * | 10/1997 | Bauer | 701/23 |
| 5,736,821 A | * | 4/1998 | Suyama | 318/16 |
| 5,764,014 A | * | 6/1998 | Jakeway et al. | 318/587 |
| 5,819,859 A | * | 10/1998 | Stump et al. | 175/26 |
| 5,938,704 A | * | 8/1999 | Torii | 701/23 |
| 6,076,025 A | * | 6/2000 | Ueno et al. | 701/23 |
| 6,255,793 B1 | * | 7/2001 | Peless et al. | 318/580 |
| 6,289,269 B1 | * | 9/2001 | Seiferling | 701/23 |
| 6,417,641 B2 | * | 7/2002 | Peless et al. | 318/580 |
| 6,463,368 B1 | | 10/2002 | Feiten et al. | |
| 6,465,982 B1 | * | 10/2002 | Bergvall et al. | 318/587 |
| 6,594,844 B2 | | 7/2003 | Jones | |
| 6,605,156 B1 | * | 8/2003 | Clark et al. | 134/6 |
| 6,615,108 B1 | * | 9/2003 | Peless et al. | 700/245 |
| 6,845,318 B1 | | 1/2005 | Moore et al. | |
| 6,885,912 B2 | * | 4/2005 | Peless et al. | 700/245 |
| 7,113,847 B2 | | 9/2006 | Chmura et al. | |
| 7,155,308 B2 | | 12/2006 | Jones | |
| 7,155,309 B2 | * | 12/2006 | Peless et al. | 700/245 |

(Continued)

OTHER PUBLICATIONS

"Enabling Your Robot to Keep Track of its Position" Revision 1.2, RidgeSoft, LLC, Pleasanton, CA: 2005, pp. 1-15.

*Primary Examiner* — Khoi Tran
*Assistant Examiner* — Bhavesh V Amin
(74) *Attorney, Agent, or Firm* — Cesari and McKenna, LLP; Michael R. Reinemann

(57) ABSTRACT

A system and method in which a user and a mobile robot cooperate to create a plan for use by the robot in navigating a space. The robot may include a tracking unit that detects the distance traveled and direction from a starting or home location and orientation. The robot also includes a navigation module that controls the movement of the robot based on a navigation plan received from a robot control utility residing at a workstation operated by the user. The robot further includes a position error correction engine that is configured to correct for position errors that may occur as the robot traverses the space. The position error correction engine receives data from one or more robot sensors that detect structures disposed below the surface over which the robot travels. As the robot encounters obstacles in the space, it enters them on the floor plan. The user then reviews the information added by the robot to the floor plan and accepts, rejects or modifies that information in order to create the navigation plan.

31 Claims, 14 Drawing Sheets

U.S. PATENT DOCUMENTS

| | | | |
|---|---|---|---|
| 7,170,252 B2 * | 1/2007 | Maeki | 318/580 |
| 7,173,391 B2 | 2/2007 | Jones et al. | |
| 7,188,000 B2 | 3/2007 | Chiappetta | |
| 7,349,759 B2 * | 3/2008 | Peless et al. | 700/245 |
| 7,429,843 B2 * | 9/2008 | Jones et al. | 318/568.12 |
| 7,430,455 B2 * | 9/2008 | Casey et al. | 700/245 |
| 7,451,027 B2 * | 11/2008 | Peteri et al. | 701/41 |
| 7,729,801 B2 * | 6/2010 | Abramson | 700/245 |
| 7,805,220 B2 * | 9/2010 | Taylor et al. | 700/253 |
| 2002/0153184 A1 * | 10/2002 | Song et al. | 180/167 |
| 2003/0028323 A1 * | 2/2003 | Zeitler et al. | 701/219 |
| 2003/0216833 A1 * | 11/2003 | Mukai et al. | 700/245 |
| 2004/0249509 A1 * | 12/2004 | Rogers et al. | 700/245 |
| 2007/0267998 A1 | 11/2007 | Cohen et al. | |
| 2009/0030551 A1 * | 1/2009 | Hein et al. | 700/253 |
| 2010/0241289 A1 * | 9/2010 | Sandberg | 701/2 |

\* cited by examiner

USER-ASSISTED ROBOT NAVIGATION SYSTEM

BACKGROUND OF THE INVENTION

1. Field of the Invention

The present invention relates generally to robotic devices and, more specifically, to a system and method for assisting mobile robots in learning to navigate a space.

2. Background Information

Robotic devices are known for performing particular activities or functions. A well-known mobile robot is the Roomba® series of room cleaning robots from iRobot Corp. of Bedford, Mass. The Roomba® robots include preset navigation routines or behaviors that are utilized by the robots to move about a room during room cleaning operations. For example, as described in U.S. Pat. No. 7,188,000, such robots may use a combination of random motion and obstacle or wall following routines in order to traverse and thus clean an entire room. Despite extensive effort in the design of such autonomous navigation routines or behaviors, such robots still fail to efficiently and thoroughly perform their respective operations, such as room cleaning.

SUMMARY OF THE INVENTION

Briefly, the present invention relates to a system and method in which a user and a robot cooperate to establish a plan for use by the robot in navigating a space efficiently. The system includes a mobile robot, such as a room cleaning robot, and a workstation running a robot control utility that is operated by the user. The robot may include a locomotion unit, a cleaning module, a processor, a memory, a communication facility, such as a wireless network adapter card, and a tracking unit. The tracking unit detects the distance traveled and direction from a starting or home location and orientation. The robot may include other elements, such as one or more obstacle sensors or detectors. The robot also includes a navigation module, which may be implemented by the processor. The navigation module controls the movement of the robot based on a navigation plan received from the robot control utility residing at the workstation. The robot and the user cooperate in the creation of the navigation plan during a planning phase, and may make revisions to the plan as the robot performs its operation in the space.

In an embodiment, the robot traverses the space according to a discovery behavior, which may be part of the navigation module. As the robot encounters obstacles in the space, the robot may implement an obstacle avoidance algorithm, which also may be part of the navigation module. The tracking module also monitors the robot's movements as it traverses the space and records these movements in memory. After traversing the space, the robot may return to a starting or home location, and initiate a communication session with the workstation. During the course of the communication session, the robot reports to the workstation on where the robot encountered obstacles in the space. The robot control utility residing at the workstation may include a drawing unit. Based on the information received from the robot, the drawing unit generates or updates an electronic, e.g., digital, floor plan of the space that shows where the robot encountered obstacles. In an embodiment, the floor plan is drawn to scale and may be modified by the user to add obstacles or spaces that were missed or mis-located by the robot as it traversed the space.

The robot control utility may include one or more navigation tools that may be operated by the user in order to add navigation information to the floor plan. For example, to assist the robot in navigating difficult areas of the space, such as narrow corridors or irregular shaped spaces, the user may specify one or more pathways to be followed or taken by the robot in at least a portion of the space. In an embodiment, the user may draw the pathways on the floor plan. The user may also specify one or more areas within the space that the robot is to avoid. The user may also specify one or more areas that the robot is to traverse multiple times. This navigation information may be embedded in the floor plan to produce a navigation-enhanced floor plan. The robot control utility residing at the workstation preferably transmits the navigation-enhanced floor plan to the robot. The robot stores the navigation-enhanced in its memory. The next time the robot traverses the space, it utilizes the information embedded in the navigation-enhanced floor plan to navigate through the space. For example, the robot follows the designated pathways set forth on the navigation-enhanced floor plan, and avoids the areas so designated.

In an embodiment, the robot further includes a position error correction engine that is configured to correct for position errors that may occur as the robot traverses the space. In particular, the robot has one or more sensors for detecting structures disposed below the surface over which the robot is traveling. For example, the robot may include a sensor that detects when the robot passes over a floor joist. The robot may include other sensors to detect other sub-surface structures, such as pipes, heating elements, wiring, reinforcing bar (rebar), etc. The position error correction error receives data generated by the sub-surface detector, and utilizes that information to recalibrate the tracking unit, thereby correcting for position errors, such as slippage errors, that may occur as the robot moves about the space.

BRIEF DESCRIPTION OF THE DRAWINGS

The invention description below refers to the accompanying drawings, of which.

DETAILED DESCRIPTION OF AN ILLUSTRATIVE EMBODIMENT

Environment

Figure 1:
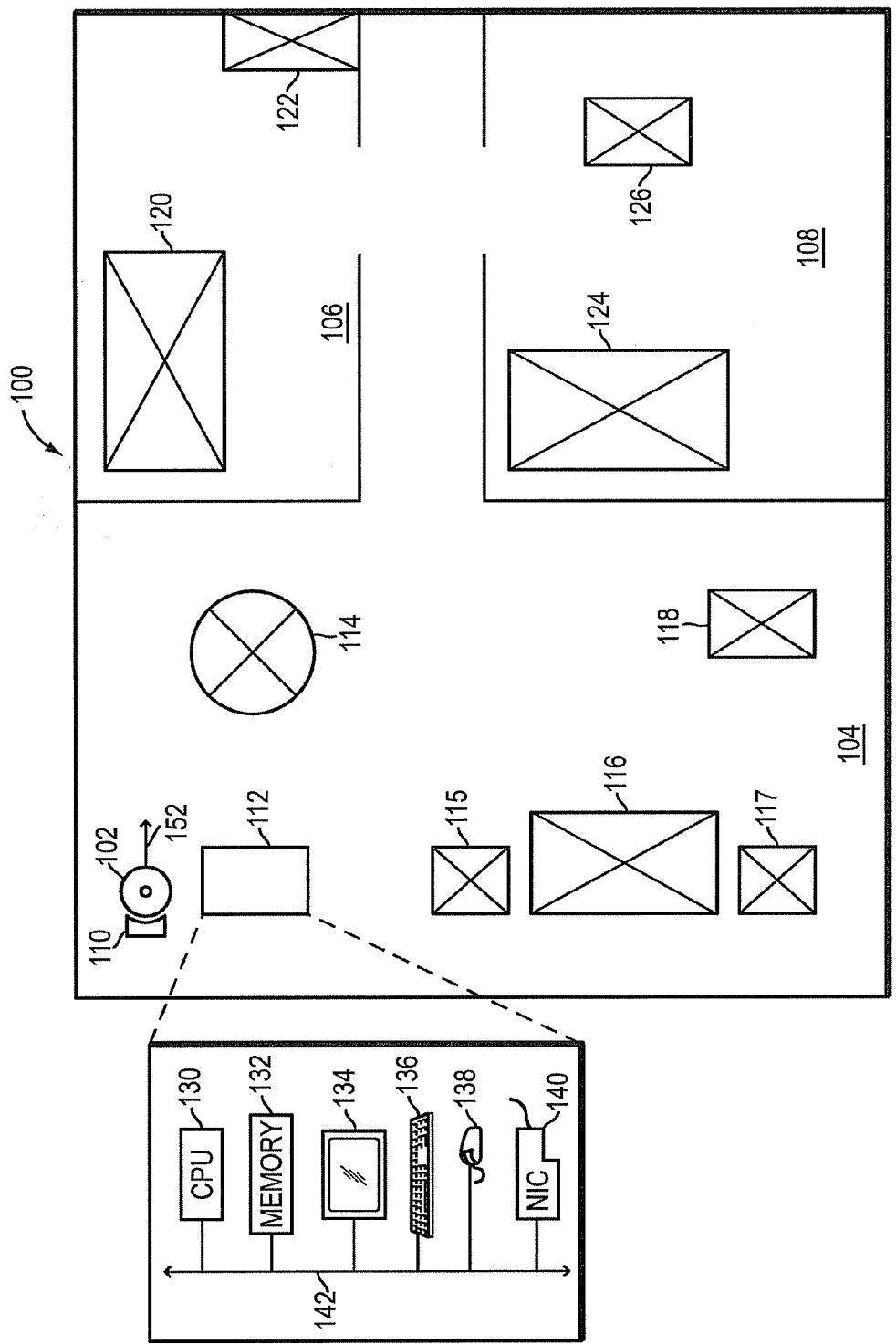
FIG. 1 is a schematic top view of a space to be navigated by a robot.

FIG. 1 is a top view of a space 100 to be navigated by a mobile robot 102. The space 100, which may correspond to a floor of a multistory house, includes a first room 104, a second room 106 and a third room 108. A robot docking station 110 and a robot management station 112 are disposed within the first room 104. The robot docking station 110 may be located adjacent to or otherwise in close proximity to the robot management station 112. The robot 102 may interface, e.g., plug into, the docking station 110, e.g., for recharging its battery. Within each room 104-108 are one or more obstacles. The obstacles may represent furniture or other objects disposed within the respective room. Specifically, within the first room 104 are obstacles 114-118. It should be understood that the management station 112, which may be disposed on a desk, and the docking station 110 may also constitute obstacles to the robot 102. Within the second room 106 are obstacles 120 and 122. Within the third room 108 are obstacles 124 and 126.

As also illustrated in FIG. 1, the robot management station 112 may include a central processing unit (CPU) 130, a memory 132, a display screen 134, one or more input devices, such as keyboard 136 and a mouse 138, and a data communication unit 140, all of which may be interconnected by one or more busses, such as a system bus 142. The robot management station 112 may also include or be coupled to a printer (not shown).

Suitable robot management stations may include workstations, desktop computers, laptop computers or other personal computers, such as the Inspiron series of desktop and laptop computers from Dell Inc. of Round Rock, Tex., or the Mac series of desktop and laptop computers from Apple, Inc. of Cupertino, Calif., among others, that have been specially configured to include a data communication unit for communicating with the robot 102 and/or its docking station 110. The robot management station 112 may run an operating system, such as the Windows® series of operating systems from Microsoft Corp. of Redmond, Wash., or the Mac series of operating systems from Apple, Inc. Those skilled in the art will understand that other platforms may be used for the robot management station.

The data communication unit 140 of the management station 112 may be a wireless network interface card (NIC), an Ethernet-based NIC, a Bluetooth interface or an infra red (IR) interface, among other devices.

Suitable docking stations include the Home Base® series of docking stations from iRobot Corp. of Bedford, Mass., and the docking station described in U.S. Pat. Publication No. 2007/0267998, which is hereby incorporated by reference in its entirety.

It should be understood that space 100 is illustrative, and that the mobile robot 102 may be used with or in other environments or spaces, including a pool, an outdoor area or space, such as a yard, etc.

Mobile Robot

Figure 2:
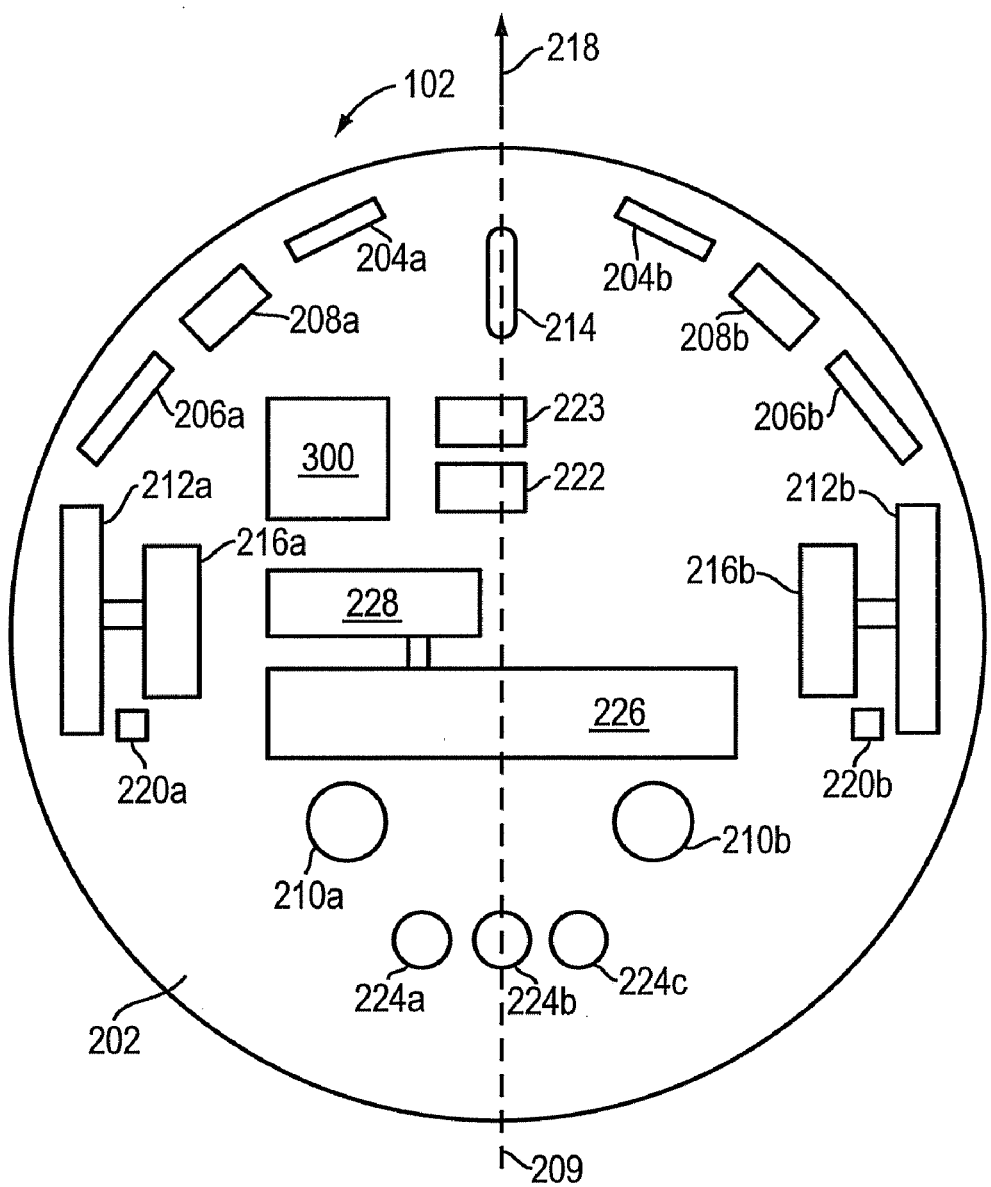
FIG. 2 is a schematic block diagram of the robot of FIG. 1.

FIG. 2 is a schematic illustration of an embodiment of the mobile robot 102. Robot 102 includes a chassis 202, which supports a plurality of mechanical and electrical components. A shell (not shown) may fit over the chassis 202 and enclose the robot's mechanical and electrical components. In particular, the robot 102 may include obstacle sensors 204a, 204b, cliff sensors 206a, 206b, and wall following sensors 208a, 208b. The obstacle or bump sensors 204a, 204b may be IR break beam sensors that are activated by contact between the robot 102 and an obstacle, although other types of sensors may be used, including mechanical switches and capacitive sensors. Non-contact sensors, which allow the robot 102 to sense its proximity to objects without physically touching the object, such as capacitive sensors or a curtain of IR light, may also be used.

Those skilled in the art will understand that robot 102 may have additional or fewer sensors. For example, the robot may further include proximity sensors, a compass, a Global Positioning System (GPS) receiver, etc.

In an embodiment, the robot 102 further includes one or more sub-surface detection sensors, such as sensors 210a and 210b. In an embodiment, the two sub-surface detection sensors 210a, 210b are symmetrically aligned about a central, e.g., longitudinal, axis 209 of the robot 102. That is, they are equidistant from the central axis. The sub-surface detection sensor 210 detects the presence of a feature or a building or construction component located underneath the floor over which the robot 102 is traveling. An exemplary sub-surface detection sensor is a stud finder that is oriented downward relative to the robot 102 in order to detect the presence of a sub-floor feature, such as a floor joist, below the robot 102. Suitable sub-surface detection sensors include the StudSensor®, MultiScanner® and MetalliScanner® series of sensors from Zircon Corp. of Campbell, CA 95008. It should be understood that the sub-surface detection sensor or sensors may be configured to detect the presence of floor joists, pipes, nails or other fasteners, wiring, reinforcing bars (rebar), duct work, support beams, or other building components. As described herein, using the sub-surface detection sensors 210, the robot 102 constructs a map of the objects located below the surface over which it travels.

Robot 102 also includes one or more two drive wheels, such as drive wheels 212a, 212b, and may include a nose or steering wheel 214. Each drive wheel 212a, 212b has a motor 216a, 216b coupled thereto for independently driving the respective drive wheel. Simultaneous operation of the two drive wheels 212a, 212b propels the robot 102 in a direction of travel illustrated by arrow 218, i.e., forward. Each drive wheel further includes a respective encoder 220a, 220b that measures the rotation of its associated drive wheel. An exemplary encoder may be an optical shaft encoder. As described herein, using the data generated by the encoders, the robot 102 can calculate its position in the space 100 from a known starting point and orientation.

The robot 102 further includes a control engine 300, a power supply 222, which may be a rechargeable battery, and a communication facility 223. The robot 102 may also include one or more user-selectable buttons 224a, 224b, 224c, which may be located on or be accessible through the shell. Button 224a may be a ROOM DISCOVERY button, button 224b may be a GO button, and button 224c may be a POWER button.

To the extent the robot 102 is a room cleaning robot, it may include a cleaning head 226, which may contain a vacuum cleaner, brushes, sponges, mops, electrostatic cloths or some combination of cleaning elements. The cleaning head 226 may be powered by a motor 228.

Suitable platforms for mobile robot 102 include the iRobot Create® series of programmable robots or the Roomba® and other series of cleaning robots from iRobot Corp., or the robots described in U.S. Pat. Nos. 7,188,000, 7,173,391, 6,594,844, each of which is hereby incorporated by reference in its entirety.

The robot's communication facility 223 may be a wireless network interface card (NIC), an Ethernet-based NIC, a Bluetooth interface or an IR interface, among other devices, and is specially configured to interface with the data communication unit 140 of the management station 112.

It should be understood that the docking station 110 (FIG. 1) may include a communication facility, and the workstation 112 may communicate with the robot 102 through the docking station 110 while the robot is connected thereto.

Robot Management Station

Figure 3:
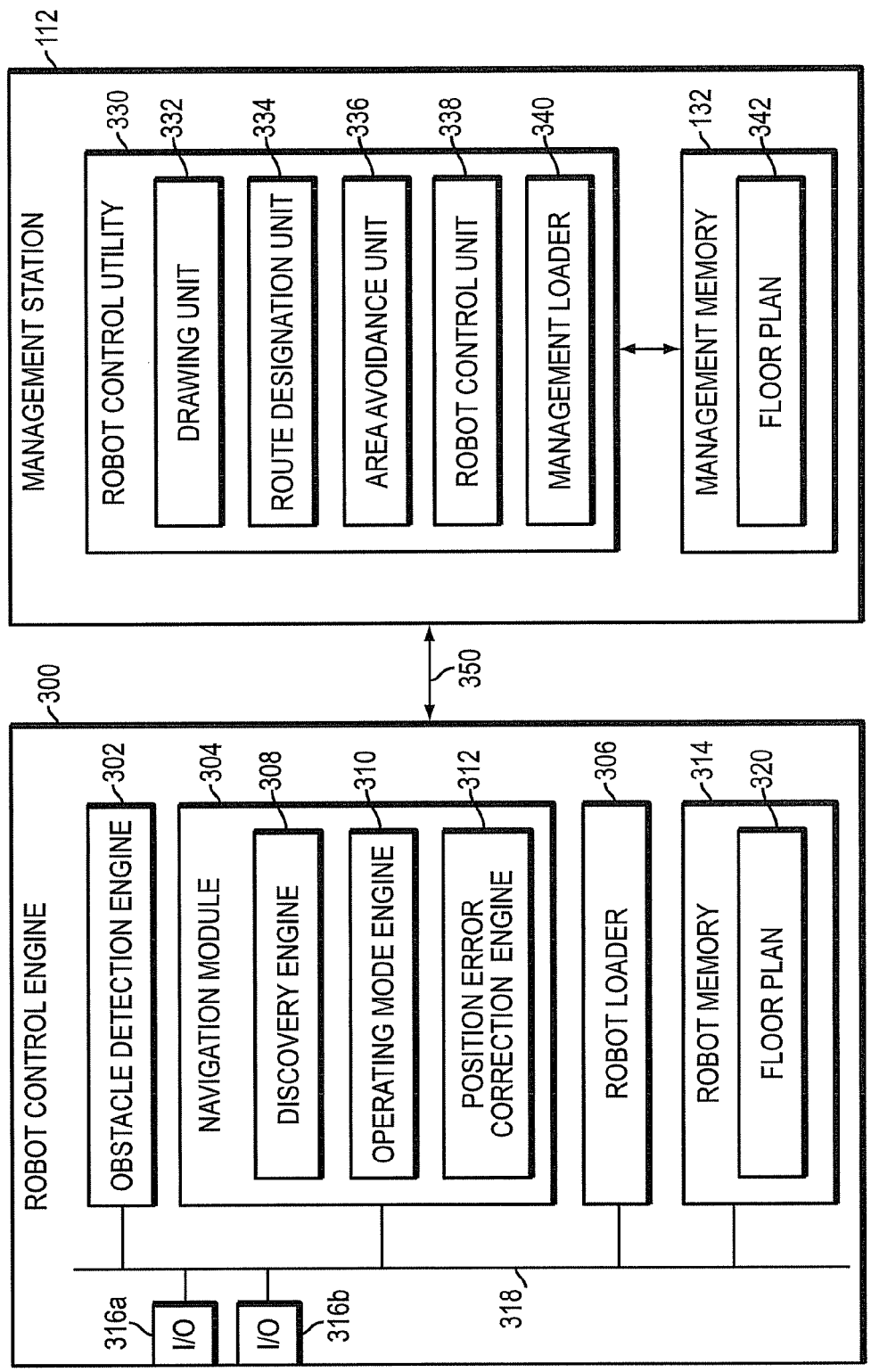
FIG. 3 is a schematic functional diagram of a control engine of the robot and a management station.

FIG. 3 is a schematic, functional illustration of the control engine 300 of the robot 102 and of the management station 112. The robot control engine 300 may include a plurality of modules. In particular, the robot control engine 300 may include an obstacle detection engine 302, a navigation module 304, and a robot loader 306. The loader 306 is configured to upload data to and download data from the management station 112. The navigation module 304 may include a discovery engine 308, an operating mode engine 310, and a position error correction engine 312. The robot control engine 300 also may include a robot memory 314, a plurality of input/output (I/O) ports, such as I/O ports 316a, 316b, and one or more busses, such as system bus 318, that interconnects engine 302, module 304, loader 306, memory 314 and I/O ports 316. The robot memory 314 may store one or more floor plans, such as floor plan 320, as described herein.

It should be understood that the I/O ports 316 interface the robot control engine 300 to the sensors, motors, communication facility, and other components of the robot, such that the robot control engine can receive data from the sensors, control the motors, and communicate with the management station 112, among other activities.

The discovery engine 308 may include one or more navigation routines or behaviors implemented by the robot 102, such as obstacle/wall following behaviors, random motion behaviors and escape behaviors, such as those described in U.S. Pat. Nos. 7,173,391, which as described above is incorporated herein in its entirety.

The robot control engine 300 may comprise or include one or more microprocessors, central processing units (CPUs), or programmable logic devices, such as Field Programmable Gate Arrays (FPGAs), Complex Programmable Logic Devices (CPLDs), Application Specific Integrated Circuits (ASICs), etc. The microprocessor, CPU or programmable logic may be configured to execute computer code or instructions stored in a memory, such as memory 314, in order to operate, as described herein.

The management station 112 may include a robot control utility 330 that, in turn, may include a drawing unit 332, a route designation unit 334, an area avoidance unit 336, a robot control unit 338, and a management loader 340 that is configured to upload data to and download data from the robot control engine 300. The robot control utility 330 communicates with the management station memory 132, which may store one or more floor plans, such as floor plan 342.

The robot control utility 330 and its various units may each comprise registers and combinational logic configured and arranged to produce sequential logic circuits. In an embodiment, the robot control utility 330 and its various units are software modules or libraries containing program instructions pertaining to the methods described herein, that may be stored on computer readable media, such as magnetic, optical or magneto-optical media, and executable by one or more processing elements, such as CPU 130 (FIG. 1). In an alternative embodiment, various combinations of software and hardware, including firmware, may be utilized.

Suitable drawing units for use with the present invention include the ConceptDraw PRO planning software from CS Odessa LLC of San Jose, Calif., the SmartDraw® planning software from SmartDraw.com of San Diego, Calif., and the SketchUp planning software from Google Inc. of Mountain View, Calif., among others.

It should be understood that the robot control engine 300 and/or the management station 112 may include more, fewer or other engines or modules.

Operation

Room Layout Discovery Phase

Figure 4A:
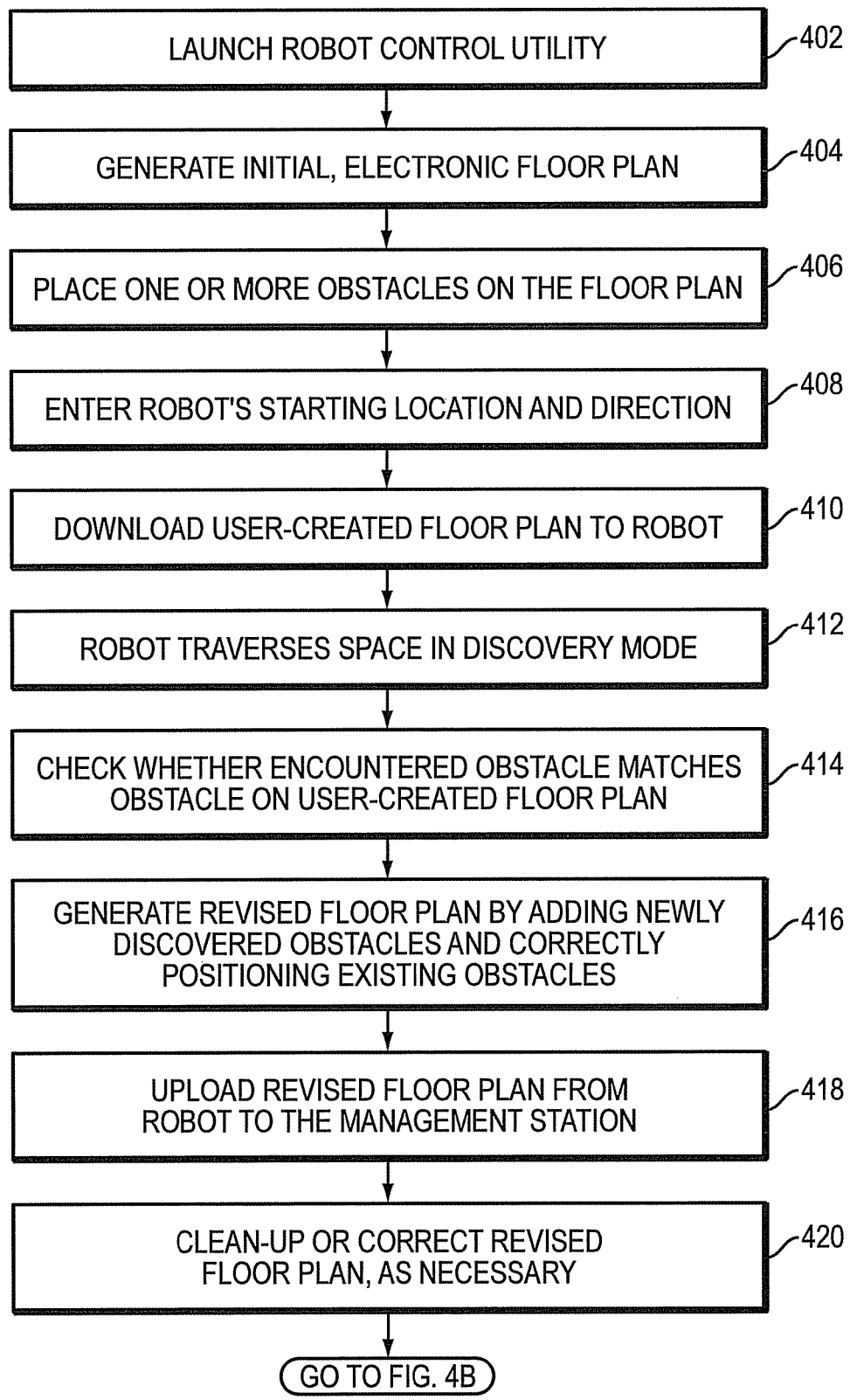
FIGS. 4A-B and 11 are flow diagrams of methods in accordance with embodiments of the present invention.
Figure 4B:
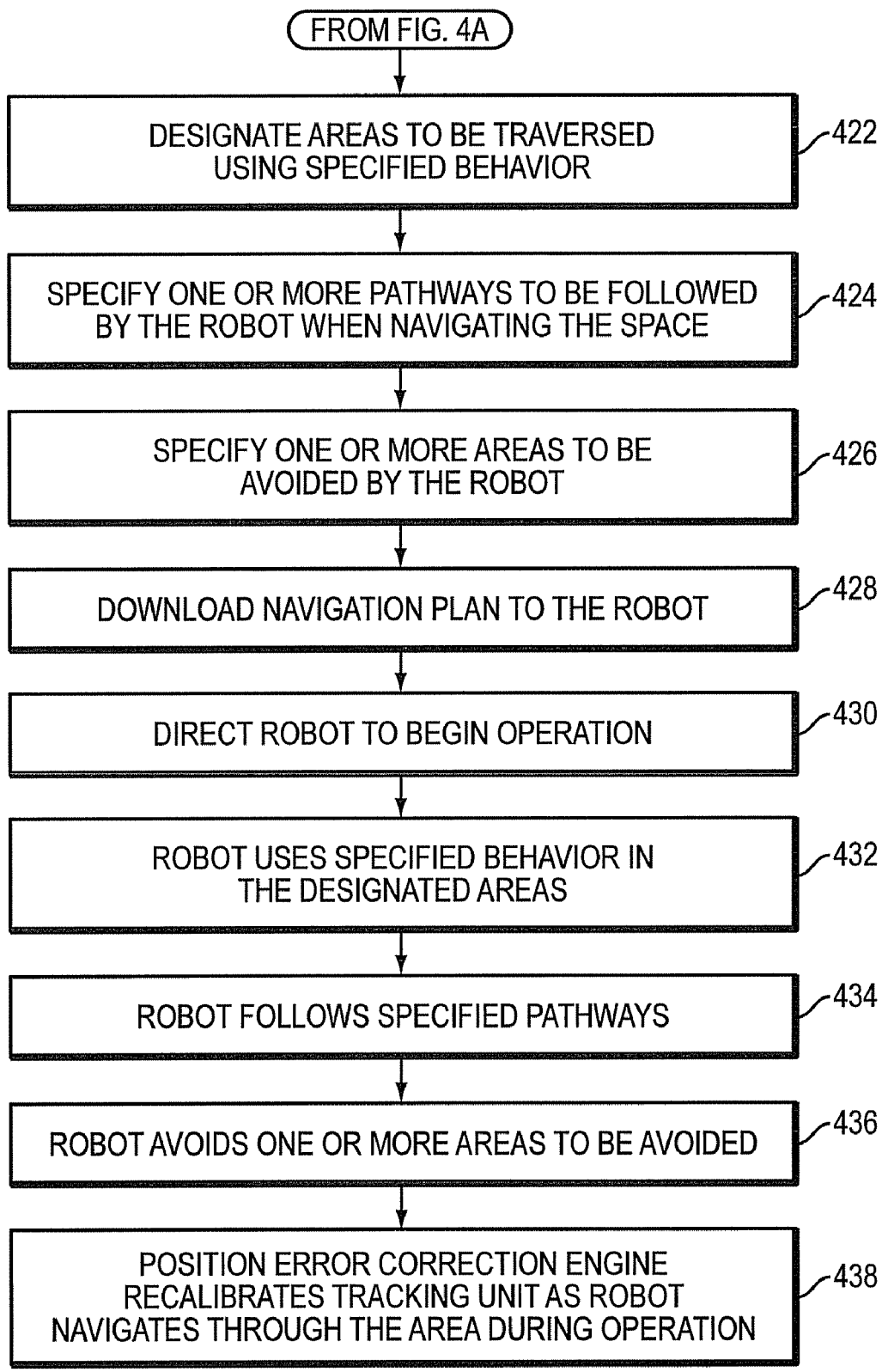

FIGS. 4A-B is a flow diagram of a method according to an embodiment of the invention. A user may launch the robot control utility 330 residing at the robot management station 112, as indicated at step 402. The robot control utility 330 may display a Graphical User Interface (GUI) on screen 134. The GUI may include a plurality of windows or panes, and a plurality of icons or command buttons organized, for example, into menu bars and toolbars for receiving input from a user. By selecting a particular command button, a user may access respective functionality of the robot control utility 330. The user accesses the drawing unit 332 of the robot control utility 330, e.g., by selecting with the mouse a drawing unit command button, and generates, e.g., "draws", an initial or preliminary floor plan of the space or environment to be navigated by the robot, as indicated at step 404. For example, the user may measure the dimensions of the rooms of the space, and may input this information into the drawing unit 332. The information may be entered textually or graphically, e.g., through one or more dialog boxes. The drawing unit 332 may be configured to present a two or three-dimensional floor plan drawing on the display screen 134 of the robot management station 112. The displayed floor plan, moreover, may be modified by the user. The drawing unit 332 may include a plurality of floor plan templates that represent common layouts of homes, and the user may select the template that most closely matches the actual floor plan of his or her home. The user may then enter the dimensions, and modify the template as necessary to match the actual space. The drawing unit 332 may include a plurality of drawing-based tools, such as a line drawing tool, a selector tool, etc.

Next, the user may designate the location of one or more of the obstacles in the rooms, as indicated at step 406. The user may actually measure the locations of these objects, e.g., relative to the walls or some other reference, or the user may draw or place them on the display in their general location. The user may also enter the starting location of the robot in the space, and the starting or initial direction to be followed by the robot upon leaving its starting location, as indicated at step 408. In particular, the user may designate the location of the robot docking station 110, and the initial direction of the robot 102 upon exiting the docking station. The drawing unit 332 also may include a palette from which the user may select commonly occurring obstacles, such as sofas, chairs, tables, bookcases, lamps, rugs, etc., and place them on the floor plan being created.

Figure 5:
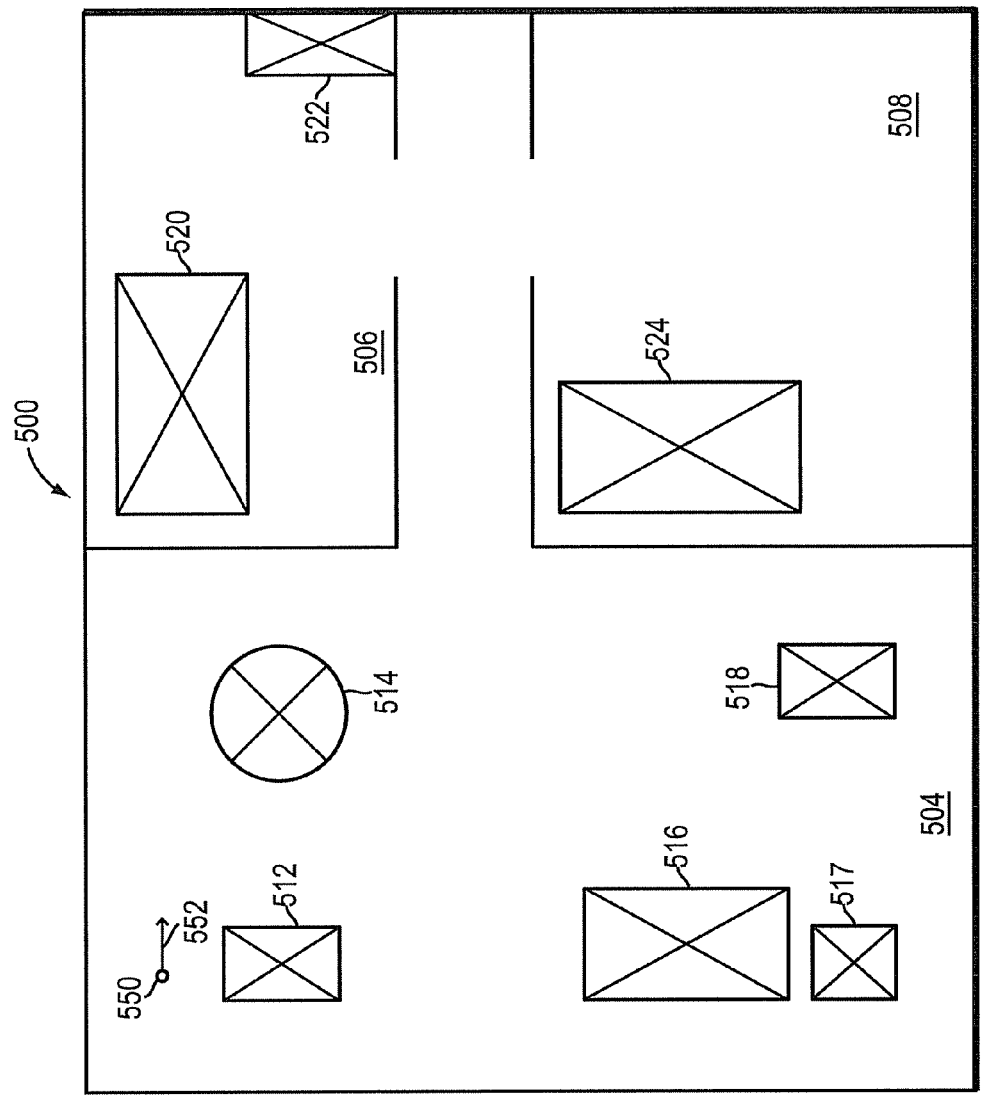
FIG. 5 is a schematic illustration of a user-created floor plan.

FIG. 5 is a schematic illustration of a floor plan 500 as generated by a user on the display 134 of the management station. Like the space 100 (FIG. 1) upon which the floor plan 500 is based, the floor plan 500 created by the user includes a first room 504, a second room 506 and a third room 508. Within room 504 are obstacles 512, 514, 516, 517 and 518. Also within the first room 504 are a starting location 550 and a starting direction, as indicated by arrow 552, of the robot 102, as entered by the user. Within second room 506 are obstacles 520 and 522. Within third room 508 is obstacle 524. A comparison of the floor plan 500 with the actual physical space 100 (FIG. 1) shows that the user missed some of the obstacles present in the space 100, such as obstacle 115, and mis-located some of the obstacles that were included in the floor plan 500, such as obstacle 118.

The user may zoom in and out of the floor plan 500, e.g., by manipulating with the mouse 138, a scale control. Furthermore the drawing unit 332 may be configured to overlay a scaled grid onto the floor plan to assist the user in drawing walls, obstacles, etc. The grid may be turned on or off by the user. In addition, the user may "pull", e.g., with the mouse 138, the corners or edges of rooms in order to alter their size.

The robot management station 112 preferably downloads the floor plan 500 created by the user to the robot 102, as indicated at step 410. In particular, the management loader 340 of the robot control utility 330 may utilize the communication channel or service established between the robot management station 112 and the robot 102, e.g., a wireless data connection, as illustrated by arrow 350 (FIG. 3) to transfer the user-created floor plan 500 to the robot 102. The robot loader 306 is configured to receive and store the user-created floor plan 500 in the robot memory 314.

The robot 102 may traverse the physical space 100 according to a discovery behavior in order to discover the size and shape of the space 100 as well as the actual location of obstacles within the space 100, as indicated at step 412. Specifically, the robot 102 traverses the space 100 in accordance with a discovery behavior. To initiate the robot's discovery behavior, the user may select the Room Discovery button 224a on the robot 102. Alternatively, the robot control unit 338 may be configured to present a graphical robot command panel on the display 314.

Figure 14:
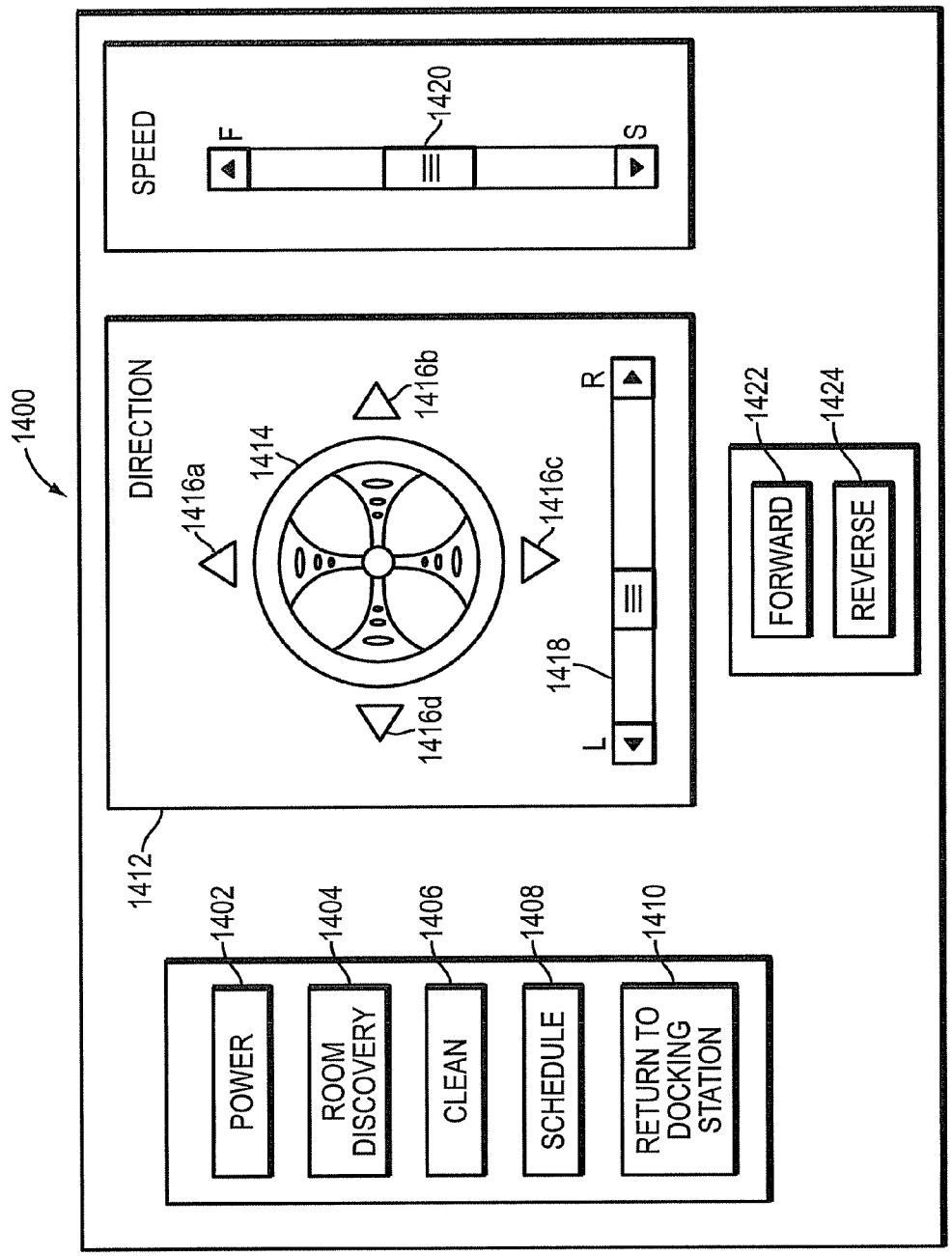
FIG. 14 is a schematic illustration of a Graphical User Interface (GUI) for controlling the robot.

FIG. 14 is a schematic illustration of a robot Graphical User Interface (GUI) 1400 that may be presented on the display 134 of the management station 112, and manipulated by the user, e.g., with the keyboard 136 and/or mouse 138, in order to control the robot 102. More specifically, the robot control unit 338 may be configured to present the GUI 1400, and to receive corresponding user inputs. These user inputs may be converted into control signals that are transmitted to and executed by the robot 102. The robot GUI 1400 may include a plurality of command buttons, such as a Power button 1402, a Room Discovery button 1404, a Go, e.g., Clean, button 1406, a Schedule button 1408, and a Return to Docking Station button 1410. The GUI 1400 may also include a directional control area 1412 having a plurality of graphical widgets for controlling the motion of the robot 102 as it moves. For example, the directional control area 1412 may include a graphical steering wheel 1414 that may be operated by the user, e.g., with the mouse 138, to change the direction of the robot 102. The directional control area 1412 may also include a series of arrows 1416a-d and a horizontal scroll bar 1418 that similarly may be operated by the user, like the steering wheel 1414, to change the direction of motion of the robot 102. The robot GUI 1400 may also include a speed control 1420, such as a vertical scroll bar, that can be manipulated to change the speed of the robot 102. The robot GUI 1400 may also include a plurality of direction buttons, such as a forward button 1422 and a reverse button 1424, that may be selected by the user to control whether the robot 102 moves in either a forward or a reverse direction.

In the discovery phase or mode, the robot 102 preferably starts from a known location, e.g., connected to the docking station 110, and known direction or orientation as indicated by arrow 152 (FIG. 1). Furthermore, as indicated above, the robot's starting point 550 and initial direction 552 may be entered in the user-created floor plan 500.

Figure 6:
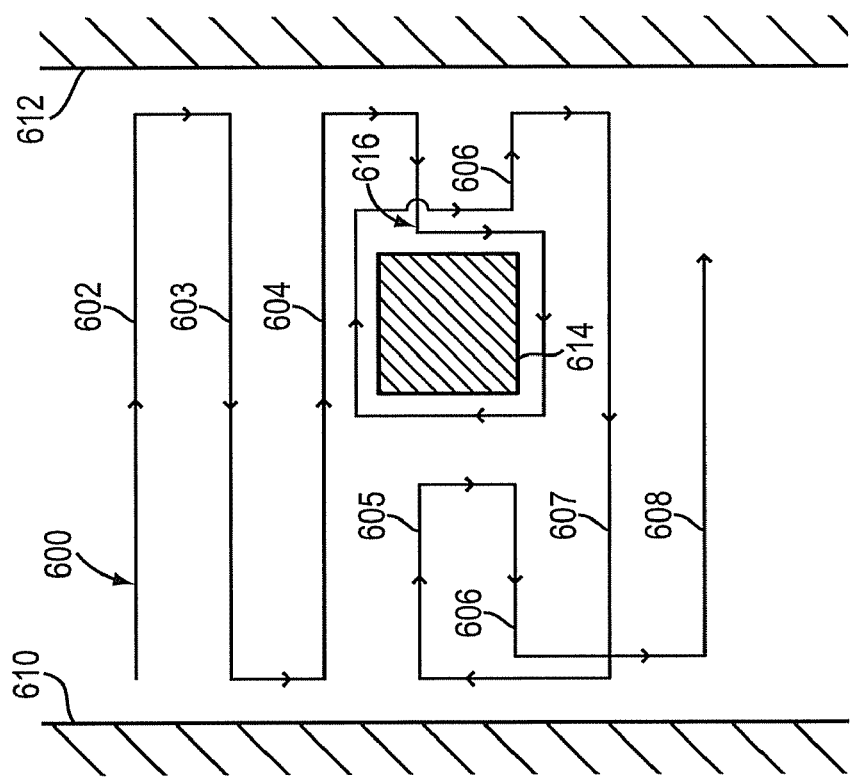

The discovery engine 308 may implement a predetermined discovery routine or behavior that is carried out, e.g., followed, by the robot 102. For example, the discovery engine 308 may control the movement of the robot 102, e.g., the operation of the drive wheels 212a, 212b, such that the robot 102 follows a plurality of parallel, spaced track lines through the space 100 being discovered. The track lines may be parallel to one or more walls of the space 100 being discovered, and spaced apart by some fraction or multiple of the width of the robot. For example, each track line may be spaced one-half the width of the robot from the next track line. FIG. 6 is a schematic illustration of the path 600 followed by the robot 102 operating according to the discovery behavior. As shown, the path 600 includes a plurality of spaced track lines 602-608 extending between opposing walls 610 and 612. As the robot 102 moves through the space 100, the discovery engine 308 tracks the distance traveled by the robot 102 and direction, based on the data generated by the encoders 220a, 220b, and records this information in the robot memory 314. When the robot 102 encounters an obstacle in the room, the distance to the obstacle from an initial location, e.g., a wall, an obstacle or some other starting point on the respective track line, is recorded. By traversing the space 100 in accordance with the discovery behavior, the robot 102 is able to determine the precise location of the walls and objects in the rooms 104, 106 and 108 relative to each other as well as the size and shape of the space 100.

Figure 7:
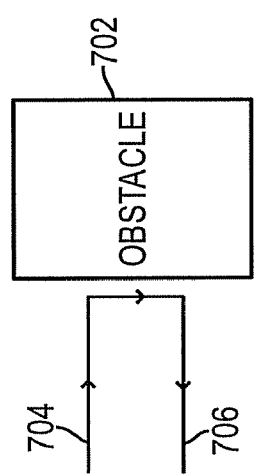
FIGS. 6-8 are schematic illustrations of paths followed by the robot during a discovery phase.
Figure 8:
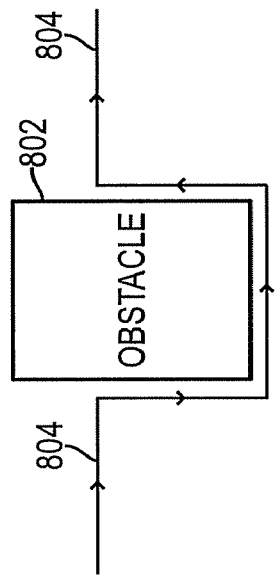

As illustrated in FIG. 6, a suitable discovery behavior may instruct the robot 102, when it encounters an obstacle, other than a wall, such as obstacle 614, to follow the periphery of the obstacle 614 until the robot returns back to the point 616 at which it first encountered the obstacle 614. At this point, the robot 102 may pick up with the next track line 606. The robot may also go back and traverse those portions of track lines 605 and 606 behind the obstacle 614 that it missed while following around the obstacle 614. FIGS. 7 and 8 illustrate alternative behaviors. As shown, in FIG. 7, when the robot encounters an obstacle 702 on a first track line 704, it may follow the obstacle until it reaches the next track line 706. The robot 102 may then continue its discovery behavior by following this new track line 706 in a direction opposite to the direction the robot was following when it encountered the obstacle 702. Alternatively, as illustrated in FIG. 8, the robot 102, upon encountering an obstacle 802 while on a first track line 804, may follow the obstacle 802 until it picks up, on the other side of the object, the same track line 804 that it was following before it encountered the obstacle 802. At this point, the robot 102 may continue following the original track line 804 in the same direction until it encounters another obstacle or a wall.

Those skilled in the art will understand that the robot may implement other discovery behaviors or various combinations of these discovery behaviors.

When the robot encounters an obstacle, such as obstacle 116 (FIG. 1), it may access the user-created floor plan 500 received from the management station 112, and determine whether the obstacle it encountered matches any of the obstacles represented on the floor plan 500, such as obstacle 516, as indicated at step 414. Suppose, for example, the user-created floor plan 500 indicates that the first room 104 is 20 feet wide. Suppose further that the robot's starting position, i.e., point 550, is two feet away from the first wall. When the robot 102 encounters an obstacle after traveling 18 feet, the robot 102 accesses the user-created floor plan 500 from memory 314, and determines that it has encountered the opposite wall as indicated on the user-created floor plan 500. If the distance to the obstacle as measured by the robot 102 does not match the distance or dimension specified in the user-created floor plan 500, the robot 102 preferably adds its understanding of the position of encountered objects, e.g., based on the distances measured the by the robot. As described herein, the location of objects as understood by the robot and added to the map is reviewed by the user who may accept, reject or modify, e.g., move, the locations of objects as determined by the robot 102.

If the obstacle encountered by the robot 102 does not match any of the obstacles on the user-created floor plan 500, such as obstacle 115, the robot 102 preferably enters the obstacle on the user-created floor plan 500 for subsequent review for acceptance or for modification by the user. More specifically, if the encountered obstacle matches the location of an obstacle represented on the floor plan within a predetermined error or tolerance limit, e.g., two feet, then the discovery engine 308 of the robot 102 concludes that the encountered obstacle is the obstacle identified on the floor plan. If the encountered obstacle does not match the location of an obstacle on the floor plan, the discovery engine 608 modifies the floor plan stored in the robot's memory 314 by adding the newly discovered obstacle. Accordingly, as the robot traverses the space, it updates the floor plan stored in its memory with the actual location of obstacles represented on the floor plan, and adds the location of newly discovered obstacles, thereby creating a revised floor plan, as indicated at step 416. For example, while the user may have indicated that a room is 20 feet wide, the robot may have discovered that the room is, in fact, 20.5 feet wide. Similarly, the robot may have discovered one or more obstacles, such as obstacle 126, that were not on the user-created floor plan 500 as received by the robot 102.

A suitable procedure for calculating the distance traveled and direction followed is described in the article *Enabling Your Robot to Keep Track of its Position* from RidgeSoft LLC (©2005), which is hereby incorporated by reference in its entirety. Those skilled in the art will understand that other procedures may be used.

Position Error Correction

Figure 9:
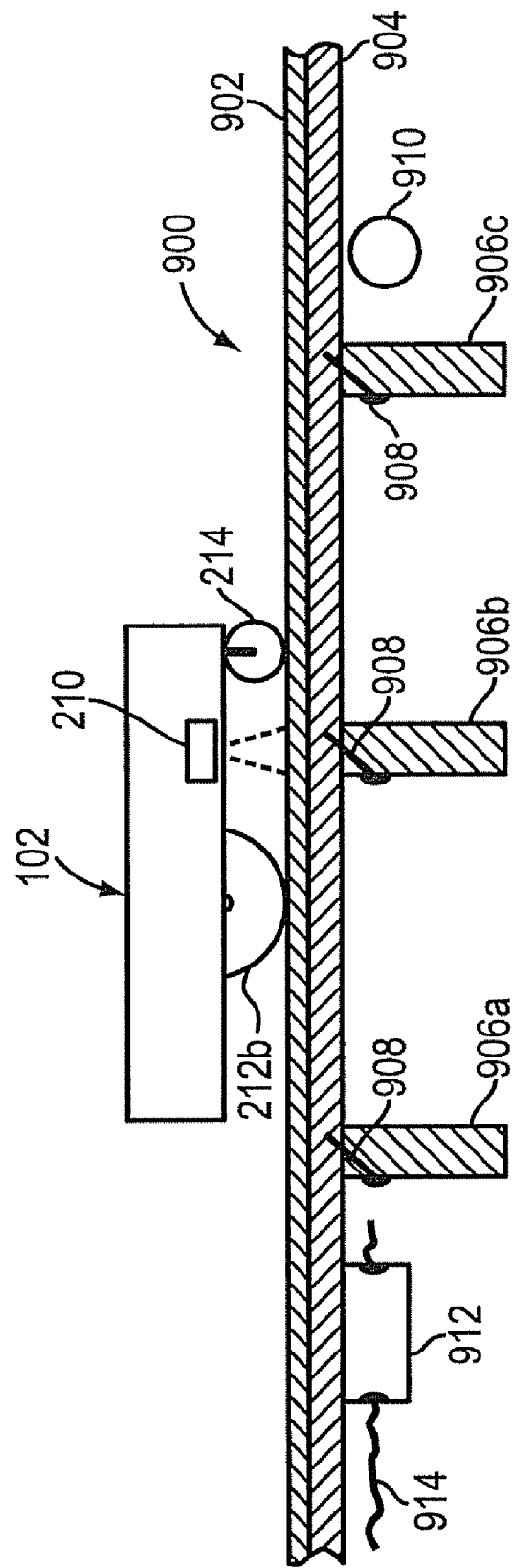
FIG. 9 is a side view of the robot traversing a floor.

To prevent the occurrence of slippage errors from generating incorrect measurements of the locations of walls and obstacles as the robot 102 traverses the space 100, the position error correction engine 312 corrects the data being generated by the encoders 220a, 220b. In an embodiment, the position error correction engine 312 may cooperate with the discovery engine 308. The position error correction engine 312 receives data generated by the sub-surface detection sensors 210a, 210b (FIG. 2). The position error correction engine 312 also received data generated by the wheel encoders 220a, 220b. FIG. 9 is a side view of the robot 102 as it moves across a floor 900, which is shown in cross-section. The floor 900 may include a top layer 902, such as wall-to-wall carpeting or hardwood flooring. Below the top layer 902 is a subfloor layer 904, which may be plywood or boards. Supporting the sub-floor layer 904 are a plurality of spaced floor joists 906a-c. The floor joists 906 may be attached to the subfloor layer 904 by fasteners 908, e.g., nails.

The sub-surface detection sensors 210a, 210b may operate continuously as the robot 102 moves across the floor 900 during the discovery phase. When the sub-surface detection sensors 210a, 210b detect the presence of a feature below the floor 900, such as the floor joist 906c, this data is captured by the position error correction engine 312, which may also store this information in the robot memory 314. For example, the location of a sub-floor feature may be added to the floor plan stored in the robot memory 314. In another embodiment, information regarding sub-floor features is stored separately from the floor plan.

In addition to floor joists 906, the sub-surface detection sensors 210a, 210b may detect the presence of other features located below the floor, such as a pipe 910, which may be a heating pipe, a water supply pipe or a wastewater pipe. The sub-surface detection sensors 210a, 210b may also detect the presence of an electrical junction box 912, and electrical wiring 914, among other sub-floor features.

Many of these subfloor features will have or follow a repeating pattern throughout a given room or space. For example, the floor joists 906 all may be spaced 12 inches apart from each other. Pipes and heating or cooling air ducts follow a generally straight path below the floor. In any event, these sub-floor features are unlikely ever to change location unlike obstacles within the space 100, such as furniture, which may be moved or even removed.

Figure 10:
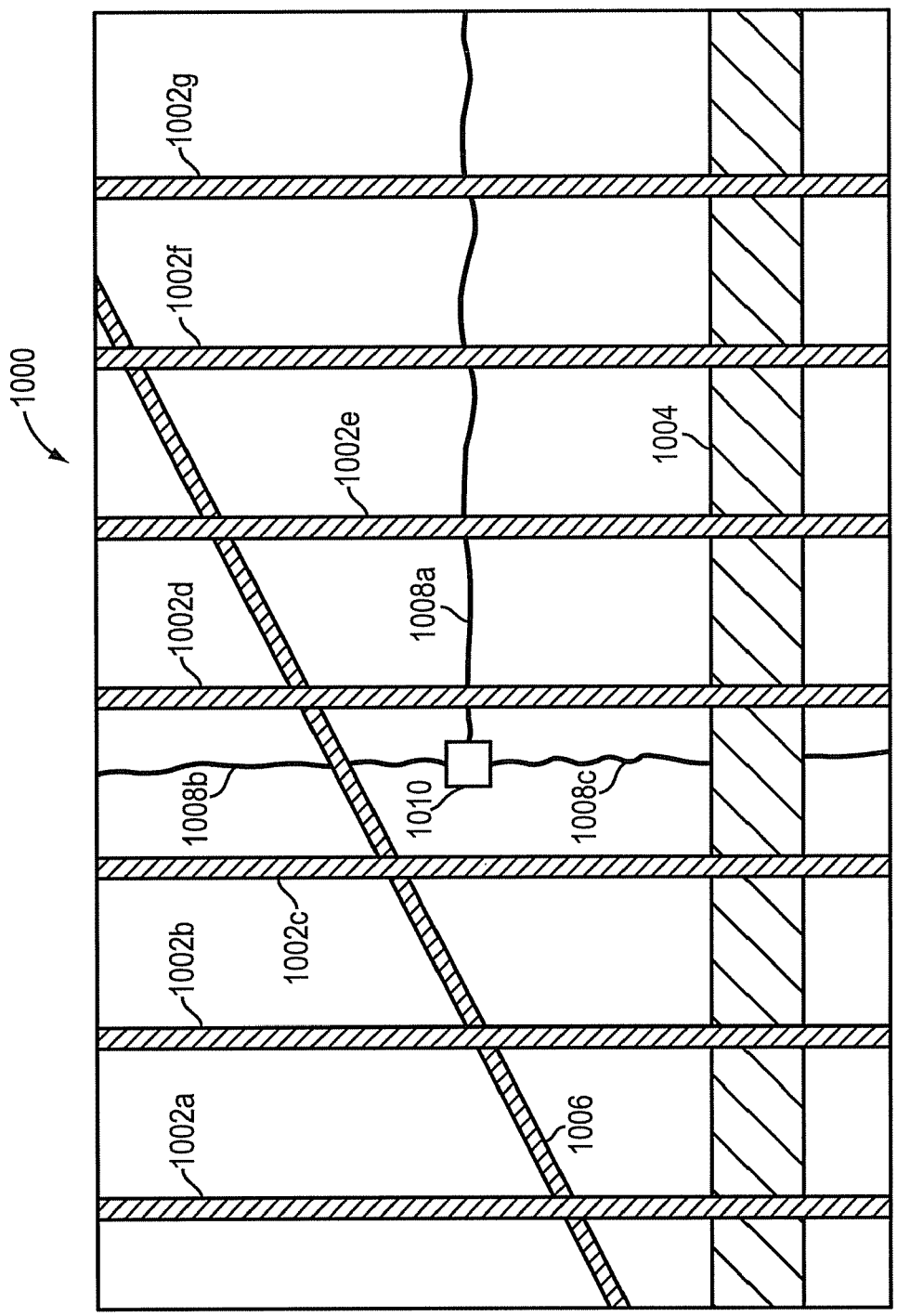
FIG. 10 is a schematic illustration of the detection of a plurality of sub-floor features by the robot.

FIG. 10 is a graphical, schematic illustration of the room information 1000 generated by the position error correction engine 312 from the data produced by the sub-floor detection sensors 210a, 210b for a room, which may be stored at memory 314. The room information 1000 includes a plurality of evenly spaced floor joists 1002a-g, an air handling duct 1004, a pipe 1006, three wire segments 1008a-c and a junction box 1010.

The position error correction engine 312 uses the data produced by the sub-surface floor detection sensor 210, and the stored location of subfloor features based on earlier or prior passes across the floor 900 (FIG. 9) to recalibrate or correct the data generated by the encoders 220a, 220b due to slippage errors. For example, after passing over one floor joist, e.g., 906b, the position error correction engine 312 may expect to pass over the next floor joist, e.g., 906c, after traveling 12 inches, assuming the robot 102 is moving perpendicular to the orientation of the floor joists 906. If instead, the next floor joist is not encountered until the robot travels 16 inches, the position error correction engine 312 may conclude, at least preliminarily, that a slippage error occurred. If the next one or more following floor joists are encountered 12 inches from the prior floor joist, then the position error correction engine 312 may conclude that a slippage error indeed occurred. In response the position error correction engine 312 may calculate the position error, e.g., four inches, and recalibrate the encoder data, e.g., by resetting or adjusting the encoder data based on the calculated position error.

Figure 11:
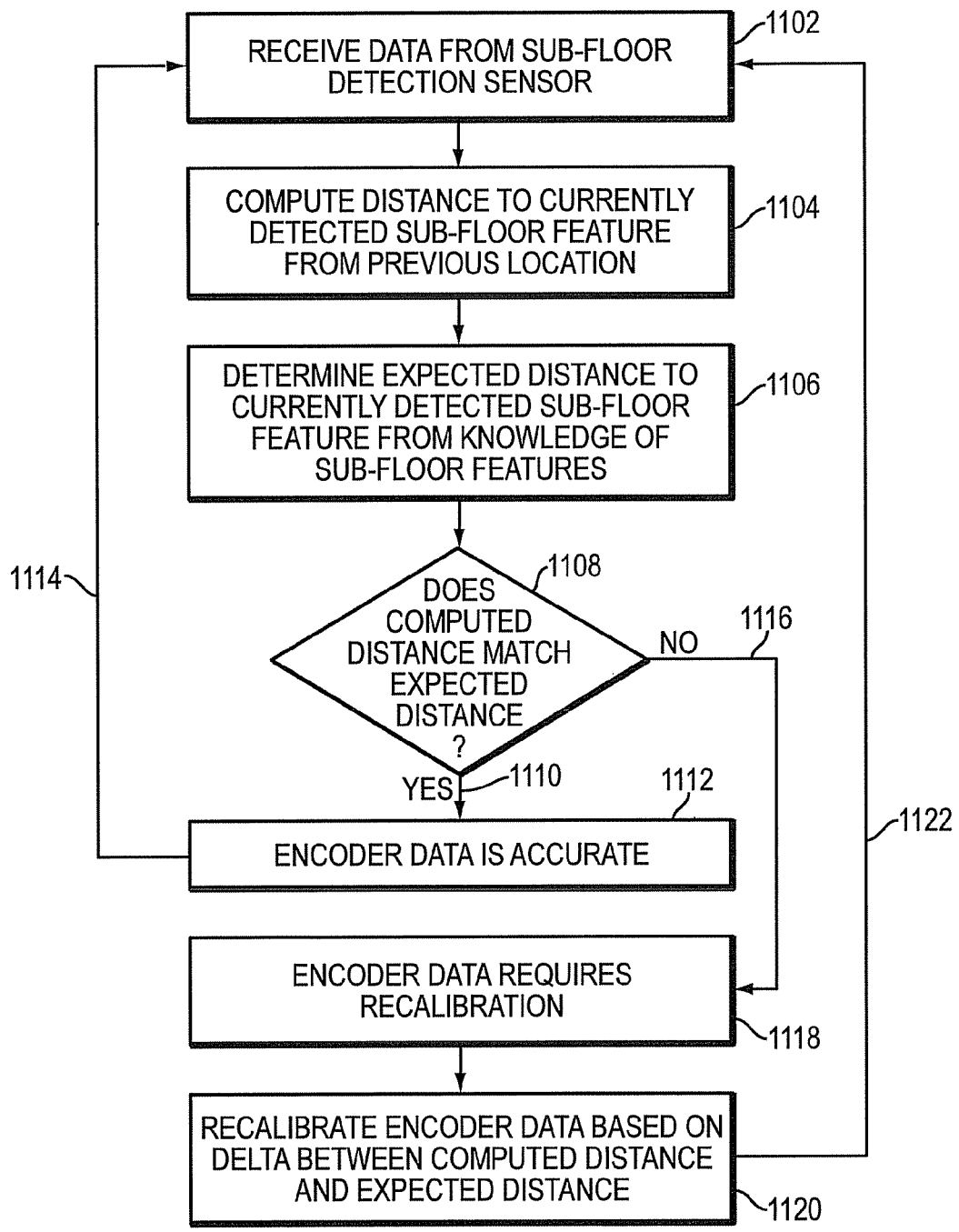

FIG. 11 is a flow diagram of a method utilized by the position error correction engine 312 to correct for slippage or other errors. As the robot 102 travels across the floor of the space, it receives data from the sub-floor detection sensors 210a, 210b indicating the presence of a feature below the floor, as indicated at step 1102. The position error correction engine 312 may compute the distance to the currently detected sub-floor feature utilizing data generated by the encoders 220a, 220b, as indicated at step 1104. In particular, the position error correction engine 312 may compute the distance to the currently detected sub-floor feature from a selected start point. The selected start point may be the previously detected sub-floor feature or an obstacle or wall. The position error correction engine 312 may also determine the expected distance from the selected start point to the currently detected sub-floor feature, as indicated at step 1106. For example, if the currently detected sub-floor feature is a floor joist and the position error correction engine 312 knows, based on its prior travel through the space, that the floor joists are spaced 12 inches apart, then it would expect the currently detected floor joist to be 12 inches from the previously detected floor joist. The determination of the expected distance to the currently detected sub-floor feature may be based on data collected by the robot during prior runs across the floor of the space, which may reveal where the currently detected sub-floor feature is located. As indicated above, this data may be stored by the position error correction engine 312, e.g., in the robot memory 314.

The position error correction engine 312 then may determine whether the measured distance matches the expected distance, as indicated at decision step 1108. For example, the position error correction engine 312 may subtract the measured distance from the expected distance and determine whether the result, e.g., a calculated position error, is below a threshold. If so, the position error correction engine may determine that the data generated by the encoders remains accurate as indicated by Yes arrow 1110 leading to step 1112, and processing may loop back to step 1102, as indicated by arrow 1114. If the delta exceeds the threshold, the position error correction engine 312 may conclude that slippage of the wheels 212a, 212b or some other error has occurred, as indicated by No arrow 1116 leading to step 1118. In this case, the position error correction engine 312 may adjust or correct the data produced by the wheel encoders 220a, 220b based on the computed delta, as indicated at step 1120. Processing may then return to step 1102, as indicated by arrow 1122.

Based on the data generated by the presence of the sub-floor detections sensors 210a, 210b, the position error correction engine 312 can also determine its path relative to subsurface features. For example, if both sensors 210a, 210b detect the presence of floor joists 1002 at the same time, the position error correction engine 312 may conclude that it is traveling in a direction perpendicular to the orientation of the floor joists 1002. If the floor joists 1002 are detected by one sensor 210a, before being detected by the other sensor 210b, the position error correction engine 312 may conclude that it is traveling at an angle relative to the joists 1002. Utilizing the difference in time between the detection of a floor joist 1002 by each of the sensors 210a, 210b and the robot's speed (or the distance traveled between the time when the first sensor 210a detected the floor joist and the time the second sensor 210b detected the floor joist), the position error correction engine 312 may determine the angle at which the robot 102 is traveling relative to the floor joists. This information, moreover, may be used to correct or confirm the robot's direction of travel, e.g., with regard to the navigation plan. For example, it may be used to return the robot 102 to a path that is perpendicular to the floor joists 1002.

It should be understood that the position error correction engine 312 may be configured alternatively or additionally to apply one or more geometric, including trigonometry, functions if the robot is encountering the floor joists, or other sub-floor features, at an angle, rather than straight on.

As described herein, by detecting a sub-floor feature, the robot 102 can confirm its actual location within the room, and recalibrate the data produced by the wheel encoders, as necessary. By virtue of the sub-surface detection sensors 210a, 210b and the position error correction engine 312, the robot 102 is able to generate accurate information regarding the position of walls and obstacles in the space, notwithstanding the occasional slippage of the wheels or other errors.

It should be understood that the robot's accurate self-determination of its location in the space does not require the installation of other components, such as triangulation data transmitters, in the room. It also does not require the placement of markers either on the floor, on the ceiling or in other locations in the space.

After traversing the space 100 according to the discovery behavior, the robot may return to its starting location, i.e., the docking station 110. The user then may initiate a communication session between the robot and the robot control utility. The revised floor plan generated by the robot, which includes accurate location information of the walls and obstacles of the space, is uploaded from the robot 102 to the management station 112, as indicated at step 418 (FIG. 4A). The management loader 340 may replace the previous version of the floor plan with the revised floor plan received from the robot 102, and store this revised floor plan in the management memory 132. The drawing unit 332 preferably accesses the revised floor plan from the management memory 132, and presents it to the user, e.g., it may be displayed and/or printed.

In an embodiment, any changes or modifications to the floor plan as suggested by the robot 102, e.g., following its discovery operation, are presented to the user, e.g., on the display 134. The user may then accept, reject or modify the changes being proposed by the robot. That is, the management loader 340 may be configured to request user authorization before accepting updates to the floor plan from the robot 102. The management loader 340 also may be configured to store each revision to the floor plan. A user may thus go back and review prior revisions to a floor plan.

It may be that the robot 102, during the discovery phase, failed to locate one or more obstacles in the space 100. It also may be that the robot erroneously determined the location or shape of one or more obstacles. If so, such errors would appear on the revised floor plan. The user may update or correct the revised floor plan through the drawing unit 332 of the robot control utility, as indicated at step 420. In an embodiment, the robot 102 is configured not to delete any information on the floor plan. Instead, changes to the floor plan proposed or suggested by the robot 102 as a result of the discovery phase are added to the floor plan and must be confirmed by the user to be made permanent. For example, the proposals or suggestions from the robot 102 may be shaded or in a selected color to distinguish them from information entered by the user. The user may then accept, reject or modify the robot's proposals or suggested changes to the floor plan. In other words, the user must always confirm any changes from the robot before those changes are accepted to the floor plan.

In an embodiment, the drawing unit 332 may present two views, e.g., floor plans, of the space 100, to the user on display 134. The first view may correspond to the user, while the second view may correspond to the robot 102. These two views, moreover, may be overlaid on each other, thereby allowing the user to better understand how the robot 102 views the space being navigated.

As shown, the user operating through the management station 112 and the robot cooperate to generate a floor plan that accurately represents the space 100 to be navigated by the robot 102.

It should be understood that in other embodiments, the user may not create an initial floor plan, or may not mark the location of any obstacles in the floor plan. In this embodiment, the robot 102 discovers the dimensions of the rooms of the space 100, and the location of all of the obstacles within the rooms.

Navigation Planning Phase

Figure 12:
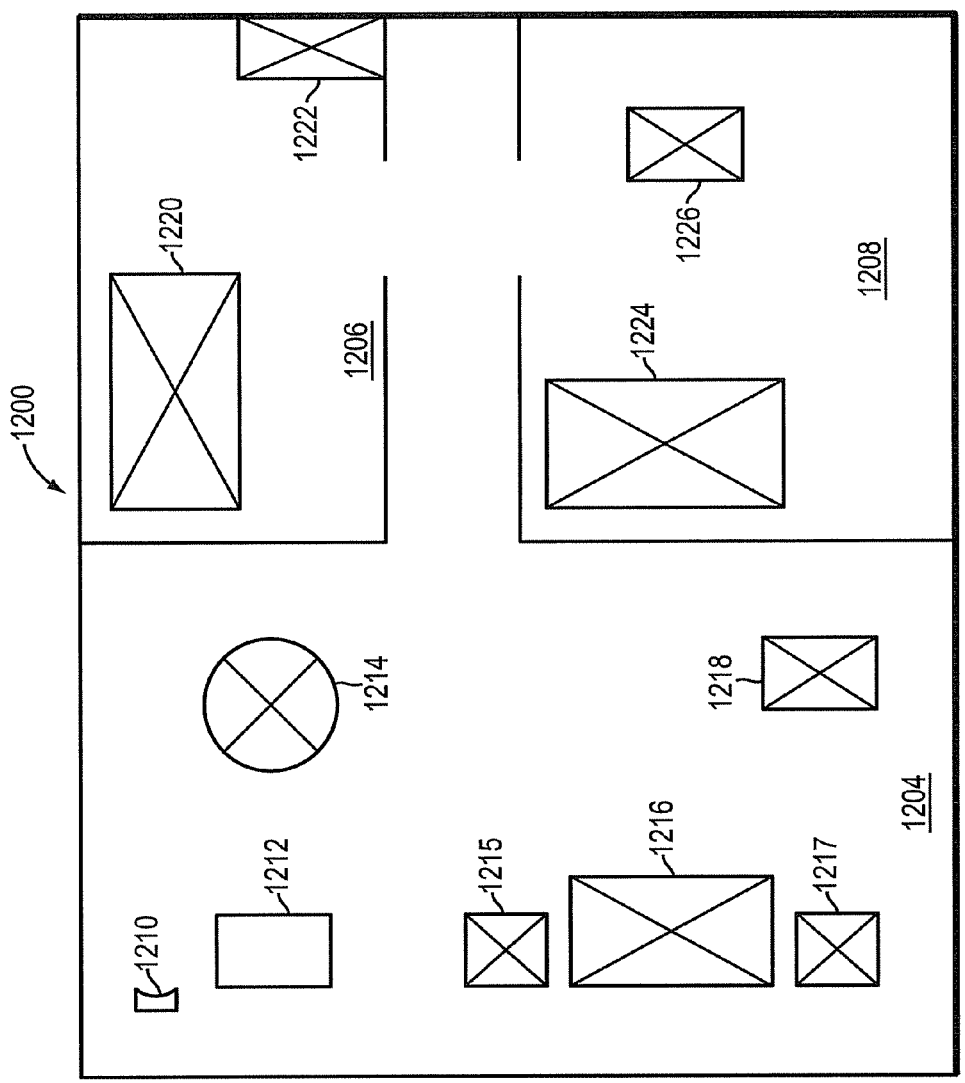
FIG. 12 is a schematic illustration of a revised floor plan as generated by the robot.

FIG. 12 is a revised floor plan 1200 as generated by the robot 102 during the discovery phase. Floor plan 1200 may include corrections or additions from the user. Like the space 100 (FIG. 1), the revised floor plan 1200 includes a first room 1204, a second room 1206 and a third room 1208. Within the first room 1204 are obstacles 1210, 1212, and 1214-1218. As indicated above, these obstacles correspond to the robot docking station 110, the robot management station 112 and various pieces of furniture. Within the second room 106 are obstacles 1220 and 1222. Within the third room 1208 are obstacles 1224 and 1226. As shown, the revised floor plan 1200 includes the obstacles specified in the user-created floor plan 500 (FIG. 5), although some have been moved to their correct position within the space as reflected on the revised floor plan 1200, as determined by the robot 102. In addition, new obstacles discovered by the robot 102, which were not present on the user-created floor plan 500 have been added to the revised floor plan 1200.

Armed with an accurate depiction of the space, i.e., revised floor plan 1200, including the precise location of walls and obstacles, the user may direct how the robot 102 navigates the space 100 when it subsequent operates within the space, e.g., during room cleaning operations. The user may access the route designation unit 334 of the robot control utility 330 residing at the management station 112. By operating the route designation unit 332, the user can specify how the robot 102 will navigate the space 100.

The route designation unit 334 may call-up the revised floor plan 1200 from the management memory 132, and present the revised floor plan 1200 on the display 134. In an embodiment, the user may designate one or more areas of the space that the robot is to traverse according to one or more preset navigation routines, such as a random motion behavior, a spot cleaning behavior, a combination of random motion behavior and obstacle/wall following behavior, etc., as indicated at step 422 (FIG. 4B). A suitable preset navigation routine is the obstacle following mode and random bounce mode described in U.S. Pat. No. 7,173,391. In particular, the user may select, e.g., using the mouse, one or more areas of the revised floor plan 122, such as a generally open area, and designate these areas as "standard navigation areas". For example, the user may draw a boundary around one or more areas of the space that are to be navigated by the robot 102 using a preset navigation routine or behavior. The route designation unit 334 may include an area designation tool (not shown).

Figure 13:
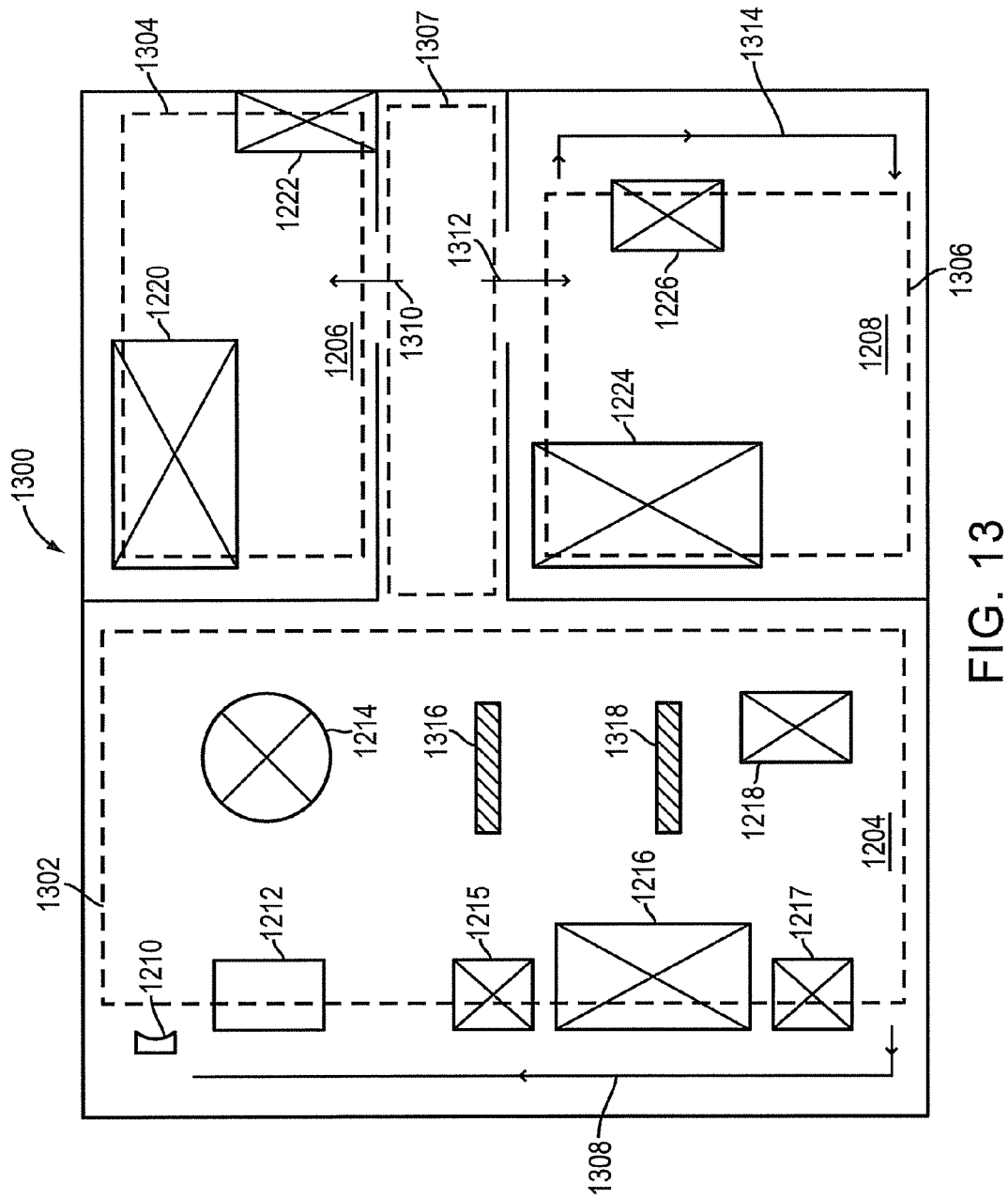
FIG. 13 is a schematic illustration of a navigation-enhanced floor plan.

FIG. 13 is a schematic illustration of a floor plan 1300 that includes user-entered navigation data or aids. The navigation-enhanced floor plan 1300 may be based on the revised floor plan 1200 and thus include the rooms 1204-1206 and obstacles 1210, 1212, 1214-1218, 1220, 1222, 1224 and 1226 from the revised floor plan 1200. Floor plan 1300 includes a plurality of areas designated by the user in which the robot 102 is to use a preset navigation routine or behavior. In particular, a first standard navigation area 1302, as specified by the user, is located in the first room 1204. A second standard navigation area 1304 is located in the second room 1206, a third standard navigation area 1306 is located in the third room 1208, and a fourth standard navigation area 1307 is located between the second and third rooms.

During operation of the robot 102, as described herein, the robot utilizes the preset navigation routine or behavior when traversing any one of the standard navigation areas 1302, 1304 and 1306 specified by the user on the navigation-enhanced floor plan 1300. For other areas within the space 100, the user may specify one or more pathways that the robot 102 is to follow when it is in these non-standard areas, as indicated at step 424. In particular, the route designation unit 334 may include a route placement tool. The user may select the route placement tool, e.g., with the mouse, and use it to "draw" one or more pathways on the navigation-enhanced floor plan 1300. A user may want to draw such a path through a narrow or confined space where the robot 102 might otherwise become stuck, such as between an obstacle and a wall or between two obstacles. As used herein, the term "narrow" or "confined" is relative to the size of the robot 102. An exemplary narrow or confined space may be a space that is narrower than twice the width of the robot. Another exemplary non-standard area is an area with limited accessibility, such as behind a wide obstacle, such as a couch, that might otherwise be missed by the robot when using its preset navigation routine or behavior.

As illustrated in the navigation-enhanced floor plan 1300, the user has placed a first defined pathway 1308 in the first room 1204. The first defined pathway 1308 is disposed between obstacles 1212 and 1215-1217 and the opposing wall. A second defined pathway 1310 corresponds to an entrance into the second room 1206, e.g., a doorway. A third defined pathway 1312 corresponds to an entrance into the third room 1208. A fourth defined pathway 1314 is defined between obstacle 1226 and the opposing wall.

It should be understood that the standard areas 1302, 1304 and 1306, and the defined pathways 1308, 1310, 1312 and 1314 are for illustration purposes only, and that a user may specify other standard areas or pathways on the navigation-enhanced floor plan 1300. For example, the user may choose to designate how the robot traverses the entire space 100 by using a plurality of defined pathways.

In an embodiment, the route designation unit 334 may be further configured to propose one or more pathways based on the configuration of the space 100. For example, the route designator may locate the largest open space and have the robot 102 follow a series of track lines within that space.

In addition to specifying standard navigation areas and defining pathways, the user also may designate one or more areas that the robot 102 is to avoid, as indicated at step 426. For example, a room may include a rug that has fringe along two opposing edges. By observing the robot 102 as it traverses the room, e.g., during the discovery phase, the user may notice that the robot occasionally gets caught or stuck on the fringe. To address this issue, the user may designate the location of the rug's fringe as an area that the robot 102 is to avoid.

In particular, the user may access the area avoidance unit 336 of the robot control utility 330 residing at the management station 112. By operating the area avoidance unit 336, the user can specify one or more areas that the robot 102 is to avoid as it traverses the space 100 performing its operation. The area avoidance unit 336 may cooperate with the route designation unit 334 in adding additional navigation data to the navigation-enhanced floor plan 1300. The area avoidance unit 336 may include an area avoidance drawing tool. The user may select the area avoidance drawing tool, e.g., with the mouse, and use it to designate one or more areas on the navigation-enhanced floor plan 1300 that the robot 102 is to avoid. The area avoidance drawing tool may be configured and selectable by the user to draw boxes, circles, ellipses or other shapes on the navigation-enhanced floor plan 1300. These shapes define the boundaries of the areas to be avoided by the robot 102. As shown in FIG. 13, the user has drawn a first avoidance area 1316 and a second avoidance area 1318 both of which are located in the first room 1204.

It should be understood that a single tool may be used to draw boundaries and that, once drawn, the user may select the area, e.g., with the mouse, and designate a property of the area, e.g., utilize preset navigation routine or behavior within area, or avoid area.

It should also be understood that the user may mark one or more areas on the navigation-enhanced floor plan that require extra cleaning by the robot 102. The user may embed navigation data that directs the robot 102 to use a particular behavior, e.g., a spiral motion behavior or a repeating behavior, within such areas. It should be further understood that the user may mark one or more areas on the navigation-enhanced floor plan that are to be cleaned with an accessory to the robot 102. For example, if the robot 102 cannot fit under a sofa, the user may designate that area to be cleaner by an accessory that extends from the robot. When the robot 102 reaches such an area, it utilizes the accessory.

The navigation-enhanced floor plan 1300 may be downloaded from the management station 112 to the robot 102 and stored in the robot's memory 314, as indicated at step 428.

Robot Operational Phase

The user may direct the robot 102 to start its operation, e.g., room cleaning, within the space 100, as indicated at step 430. For example, the user may select the GO button 224b (FIG. 2) located on the robot 102. Alternatively, the user may select, e.g., with the mouse 138, the CLEAN button 1406 (FIG. 14) of the graphical robot command panel 1400 presented on the display screen 134 of the management station 112. In an embodiment, the robot 102 may be scheduled to perform its operation, e.g., room cleaning, on a periodic basis according to some schedule, e.g., every Monday and Thursday starting at 10:00 am. For example, the user may select the schedule button 1408 and enter a schedule in a dialog box and/or an electric calendar (not shown).

In response to being directed to operate, the operating mode engine 310 of the navigation module 304 of the robot 102 accesses the navigation-enhanced floor plan 1300 from memory 314. The operating mode engine 310 directs the motion of the robot 102, e.g., by commanding wheel motors 216a, 216b, in accordance with the navigation data embedded in the navigation-enhanced floor plan 1300. For example, while the robot is within any of standard areas 1302, 1304, 1306 or 1307, the operating mode engine 310 uses a preset navigation routine or behavior, as indicated at step 432. The operating mode engine 310 also directs the robot 102 to follow the specific pathways 1308, 1310, 1312, and 1314 embedded on the navigation-enhanced floor plan 1300, as indicated at step 434. The operating mode engine also controls the wheel motors to prevent the robot from entering the avoidance areas 1316 and 1318, as indicated at step 436.

The robot 102 preferably starts from a known location, e.g., starting point 550 (FIG. 5), and known direction or orientation, e.g., arrow 552, within the space 100.

As the robot 102 traverses the space 100 during operation, e.g., room cleaning, the position error correction engine 312 monitors data generated from the sub-surface detection sensor 210 and recalibrates data from encoders 220a, 220b, as described above in connection with FIG. 11, as indicated at step 438. By recalibrating the encoders as it traverses the space 100, the robot 102 is able to accurately determine its position within the space 100, and thus carry out the navigation plan established by the user.

The operating mode engine 310 preferably records the robot's movement through the space during each session, e.g., each cleaning. That is, as the robot 102 follows the current navigation plan, the operating mode engine 310 tracks the data from the wheel encoders, as corrected by the position error correction engine 312, and may store this data in the robot memory 314. When the robot 102 returns to the docking station 110, the robot loader 306 may upload this information to the management loader 340 of the robot control utility at the management station 112, which in turn may store it in management memory 132. The drawing unit 332 may access this information, which may be in the form of "bread crumb" tracks or trails, and present it to the user on the display 134. These bread crumb tracks may be displayed in a similar manner as that shown in FIGS. 6-8. A suitable technique for presenting such track logs is described in U.S. Pat. No. 6,845,318, which is hereby incorporated by reference in its entirety.

The drawing unit 332 may overlay these bread crumb tracks onto the floor plan so that the user may evaluate how well the robot 102 was able to follow the navigation plan, and how well it was able to perform its function, e.g., room cleaning. The bread crumb tracks may be animated, e.g., blinking, to better distinguish them. If the robot 102 successfully implemented the navigation plan, then the bread crumb tracks will appear on top of the specified pathways of the navigation plan. If the robot 102 encountered difficulties following the navigation plan, this may be revealed by the bread crumb tracks being spaced or different from the corresponding specified pathways. In the response, the user may make modifications to the navigation plan. That is, the user may make modifications to those portions of the navigation with which the robot experienced difficulty. In an embodiment, the user may "grab", e.g., with the mouse 138, the navigation pathways and move, resize or otherwise alter them to change the cleaning strategy. The user may then save these changes in a revised navigation plan that may be downloaded to the robot 102, and utilized during the next cleaning session. In this way, the user and robot can refine the navigation plan over time to better achieve the robot's objectives, e.g., room cleaning.

Figure 15:
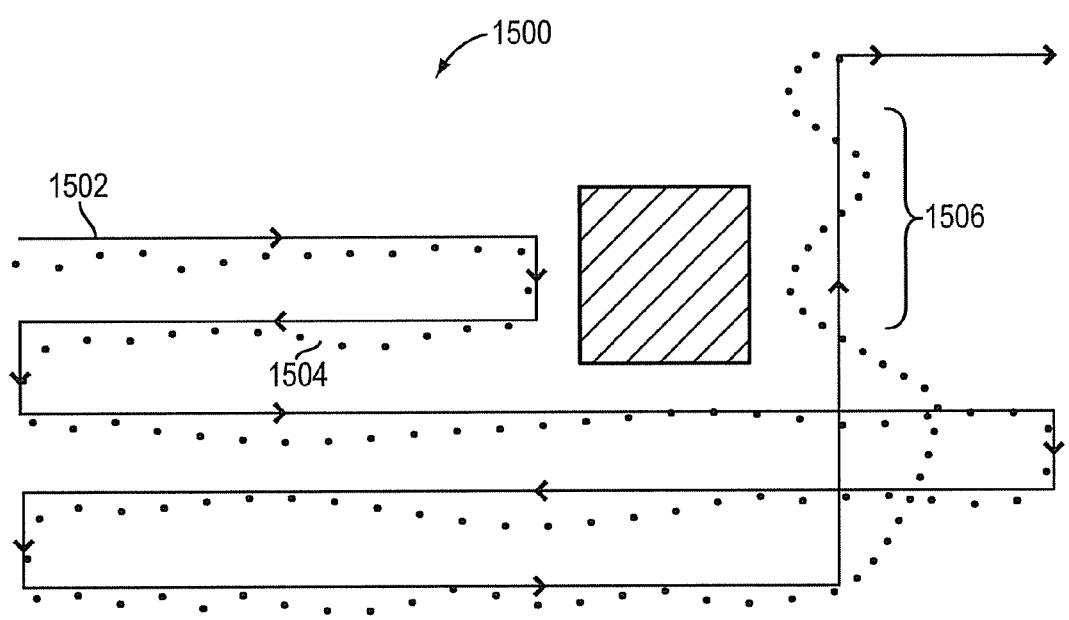
FIG. 15 is a schematic illustration of a portion of a floor plan, a navigation and a track log.

FIG. 15 is a schematic illustration of a portion of a floor plan 1500 having a navigation plan included thereon, as indicated by pathway 1502. Also displayed on the floor plan 1500 is a bread crumb track log 1504 that represents the path actually followed by the robot 102 in implementing the navigation plan represented by pathway 1502. As shown, the track log 1504 diverges significantly from a vertical portion 1506 of the pathway 1502. In response, the user may modify the navigation plan, e.g., by not requiring the robot 102 to make such a sharp left turn at the vertical portion 1506 of the pathway 1502.

In an embodiment, the user may direct the motion of the robot 102 in real-time using the robot GUI 1400, as a remote control. For example, the user may operate, e.g., with the keyboard 136 or mouse 138, the steering wheel 1414, the arrows 1416a-d, and/or scroll bar 1418. The robot control unit 338 may be configured with a remote control feature for controlling the motion of the robot from the management station 112. Alternatively, a hand-held remote control unit (not shown) may be operated by the user to direct the motion of the robot 102.

If the robot 102 becomes overly disturbed, the operating mode engine 310 may be configured to return to the docking station 110. That is, if the robot 102 gets off-track from or otherwise loses the navigation plan, e.g., through excessive wheel slippage on rug fringe, and is unable to return to or otherwise resume the navigation plan, it may return to the docking station 110, and provide the bread crumb track log to the management station 112 for review by the user. The user may respond by modifying the navigation in an effort to avoid the problem that triggered the condition. Alternatively or additionally, if the user notices that the robot 102 appears to have gone off the navigation plan, the user may select the Return to Docking Station button 1410. In response, the robot 102 may stop its cleaning operation, and return to the docking station 110. Again, the user may then evaluate the robot's "bread crumb" track log in an effort to determine how the robot became stuck, and the user may change the navigation plan for the space 100 in an effort to avoid that problem in the future.

If the robot 102 encounters a newly discovery obstacle or object while performing its operation, e.g., room cleaning, the navigation module 304 may be configured to implement the discovery engine 308 in order to determine the location of this new obstacle, and store its location in the robot memory 314, e.g., on the floor plan. This information may then be uploaded to the management station 112 when the robot 102 returns to the docking station 110. The robot control utility 332 may be configured to signal an alert, such as a visual or aural alert to the user, indicating that a new obstacle was discovered by the robot 102. The information concerning the new obstacle may be presented to the user who may accept, reject or modify this information, as discussed above.

It should be further understood that the robot 102 may be configured to access a centralized vacuum system to unload the debris collected by the robot 102 during its cleaning activities. That is, the robot 102 may have a sensor to determine when a debris container is full or nearly full. In response, the robot 102 may access the centralized vacuum system or some other device and offload the debris collected by the robot 102. The robot 102 may then return to the point in the space 100 when this "full load" condition was encountered, and resume its cleaning operations.

In an embodiment, the robot 102 may include an environmental or other sensor that triggers the robot to begin its operation, e.g., cleaning. For example, an industrial cleaning robot may include a sensor for detecting the presence of fuel vapors in the air, thereby indicating a possible fuel spill by a machine or vehicle. In response, the robot may begin its cleaning operation. Furthermore, the robot 102 may utilize the environmental sensor to locate the source of the fuel spill, and begin its cleaning operation at that location. For example, the robot may be configured to follow a path of increasing fuel vapor concentration as detected by the environmental sensor.

The foregoing description has been directed to specific embodiments of this invention. It will be apparent, however, that other variations and modifications may be made to the described embodiments, with the attainments of some or all of their advantages. For example, the present invention may be used with other robotic devices besides room cleaning robots, such as painting robots, pool cleaning robots, lawn mower robots (which detect underground features), etc. Therefore, it is the object of the appended claims to cover all such variations and modifications as come within the true spirit and scope of the invention.

What is claimed is:

1. A mobile robot comprising:
    a controllable drive element operable to move the robot over a surface;
    at least one sub-surface detector configured to sense the presence of a feature located below the surface over which the robot moves;
    a memory coupled to the at least one sub-surface detector for storing data generated by the at least one sub-surface detector; and
    a discovery engine coupled to the controllable drive element and to the memory, the discovery engine configured to
        operate the controllable drive element to move the robot autonomously according to a predetermined discovery routine within a space,
        determine a location of at least one obstacle encountered by the robot as the robot moves within the space according to the predetermined discovery routine, the at least one obstacle impeding the movement of the robot within the space,
        store the determined location of the at least one obstacle in the memory, and
        provide the determined location of the at least one obstacle to a management station.

2. The mobile robot of claim 1 further comprising:
    one or more encoders coupled to the controllable drive element, the one or more encoders configured to generate data corresponding to a distance traveled by the robot; and
    a position error correction engine coupled to the one or more encoders and the memory, the position error correction engine configured to utilize the data generated by the at least one sub-surface detector to produce a position error.

3. The mobile robot of claim 2 further comprising:
    a navigation module coupled to the controllable drive element, the navigation module operating the controllable drive element to direct the robot to follow a navigation plan through the space, wherein
        the navigation plan includes the location of the at least one obstacle as determined by the discovery engine.

4. The mobile robot of claim 3 wherein the navigation module is coupled to the position error correction engine, and is configured to utilize the position error in order to follow the navigation plan.

5. The mobile robot of claim 1 wherein the at least one sub-surface detector is configured to sense the presence of one or more of:
    a floor joist,
    a reinforcing bar (rebar),
    a pipe,
    an electrical wire, and
    a duct work.

6. The mobile robot of claim 1 wherein the controllable drive element includes two drive wheels and at least one motor operatively coupled to the two drive wheels.

7. The mobile robot of claim 2 the position error produced by the position error correction engine corresponds to slippage of one or more of the two drive wheels.

8. The mobile robot of claim 1 further comprising:
    a longitudinal axis, and
    two sub-surface detectors that are symmetrically aligned about the longitudinal axis of the robot.

9. The mobile robot of claim 2 wherein the position error detection engine is configured to
    determine distances between sub-surface features as the robot moves over the surface, and
    compare a currently determined distance between two sub-surface features with a previously determined distance between the two sub-surface features to produce the position error.

10. The mobile robot of claim 1 further comprising a cleaning element for cleaning the surface over which the robot moves.

11. A method for programming a mobile robot to navigate a space, the method comprising:
    producing a floor plan of the space to be navigated by the robot;
    receiving one or more proposed modifications to the floor plan from the robot, the one or more proposed modifications corresponding to a location of at least one obstacle encountered by the robot as it moved about the space during a discovery phase, the at least one obstacle impeding movement of the robot in the space;
    accepting or rejecting the one or more proposed modifications to the floor plan from the robot;
    generating, on a processor, a navigation plan for the space; and
    providing the navigation plan to the robot for use by the robot in navigating the space.

12. The method of claim 11 wherein the navigation plan includes at least one user-specified pathway through a portion of the space to be navigated by the robot.

13. The method of claim 11 wherein the navigation plan identifies at least one user-specified area in the space that is to be avoided by the robot.

14. The method of claim 11 wherein
    the floor plan includes at least one obstacle in the space, and the one or more proposed modifications includes a change in the location of the at least one obstacle.

15. The method of claim 11 further comprising receiving a report from the robot that describes how the robot navigated through the space.

16. The method of claim 15 further comprising revising the navigation plan by a user based on the report received from the robot.

17. The method of claim 14 wherein the floor plan is a two-dimensional, user-created graphical representation of the space to be navigated.

18. The method of claim 11 wherein the navigation plan identifies at least one user-specified area in the space in which the robot is to use a preset navigation routine.

19. The method of claim 11 wherein the navigation plan is included in the floor plan.

20. The method of claim 11 wherein the generating the navigation plan comprises drawing navigation data onto the floor plan.

21. A mobile robot comprising:
a controllable drive element operable to move the robot over a surface;
a memory;
a discovery engine coupled to the controllable drive element and to the memory, the discovery engine configured to
operate the controllable drive element to move the robot according to a predetermined discovery routine within a space,
determine a location of at least one object that is encountered by the robot as the robot moves within the space, and that impedes movement of the robot,
store the determined location of the at least one movement impeding object in the memory, and
provide the determined location of the at least one movement impeding object to a management station; and
a navigation module coupled to the controllable drive element, the navigation module operating the controllable drive element to direct the robot to follow a navigation plan through the space, wherein
the navigation plan accounts for the location of the at least one movement impeding obstacle as determined by the discovery engine.

22. The mobile robot of claim 21 further comprising:
at least one sub-surface detector configured to sense the presence of a feature located below the surface over which the robot moves;
one or more encoders coupled to the controllable drive element, the one or more encoders configured to generate data corresponding to a distance traveled by the robot; and
a position error correction engine coupled to the one or more encoders and the memory, the position error correction engine configured to utilize the data generated by the at least one sub-surface detector to produce a position error.

23. The mobile robot of claim 22 wherein navigation module is coupled to the position error correction engine, and is configured to utilize the position error in order to follow the navigation plan.

24. The mobile robot of claim 22 wherein the position error detection engine is configured to
determine distances between sub-surface features as the robot moves over the surface, and
compare a currently determined distance between two sub-surface features with a previously determined distance between the two sub-surface features to produce the position error.

25. The mobile robot of claim 21 further comprising:
a cleaning element for cleaning the surface over which the robot moves.

26. A method for programming a mobile robot to navigate a space, the method comprising:
traversing, by the mobile robot, at least a portion of the space;
determining, by the mobile robot, a location of at least one obstacle in the space as the mobile robot traverses the at least a portion of the space, the at least one obstacle impeding movement of the mobile robot in the at least a portion of the space;
storing the determined location of the at least one obstacle in a memory of the mobile robot;
providing the determined location of the at least one obstacle from the mobile robot to a management station;
generating, at the management station, a navigation plan of the space, the navigation plan accounting for the determined location of the at least one obstacle;
providing the navigation plan from the management station to the mobile robot.

27. The method of claim 26 further comprising:
utilizing, by the mobile robot, a predetermined discovery routine to traverse the at least a portion of the space.

28. The method of claim 26 wherein the navigation plan includes at least one selected from the group consisting of:
a route for navigating around the determined location of the at least one obstacle when navigating within the space,
one or more pathways to be followed by the mobile robot when navigating within the space,
one or more first areas to be avoided by the mobile robot when navigating within the space, and
one or more second areas to be traversed according to a preset navigation routine.

29. The method of claim 28 further comprising:
utilizing, by the mobile robot, the navigation plan when navigating within the space.

30. The method of claim 26 further comprising:
performing a cleaning operation, by the mobile robot, in the space.

31. The method of claim 30 wherein the cleaning operating includes vacuuming the space.

* * * * *